(12) United States Patent
Tagawa et al.

(10) Patent No.: US 8,648,021 B2
(45) Date of Patent: Feb. 11, 2014

(54) LUBRICANT BASE OIL AND A PROCESS FOR PRODUCING THE SAME, AND LUBRICATING OIL COMPOSITION

(75) Inventors: Kazuo Tagawa, Tokyo (JP); Shigeki Matsui, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 168 days.

(21) Appl. No.: 13/122,600

(22) PCT Filed: Oct. 7, 2009

(86) PCT No.: PCT/JP2009/067504
§ 371 (c)(1),
(2), (4) Date: May 24, 2011

(87) PCT Pub. No.: WO2010/041689
PCT Pub. Date: Apr. 15, 2010

(65) Prior Publication Data
US 2011/0237477 A1    Sep. 29, 2011

(30) Foreign Application Priority Data

Oct. 7, 2008  (JP) ................. P2008-261071
Oct. 7, 2008  (JP) ................. P2008-261077
Oct. 7, 2008  (JP) ................. P2008-261082

(51) Int. Cl.
*C10M 169/04*  (2006.01)
*C10M 145/14*  (2006.01)
*C10G 71/00*  (2006.01)

(52) U.S. Cl.
USPC ................ 508/469; 508/110; 208/19

(58) Field of Classification Search
USPC .................... 508/110, 469; 208/19
See application file for complete search history.

(56) References Cited

U.S. PATENT DOCUMENTS

| | | |
|---|---|---|
| 2,861,941 A | 11/1958 | Jancosek et al. |
| 2,890,161 A | 6/1959 | Brown et al. |
| 3,078,222 A | 2/1963 | Henke et al. |
| 3,847,790 A | 11/1974 | Putz |
| 4,021,357 A | 5/1977 | Morduchowitz et al. |
| 4,867,894 A | 9/1989 | Pennewiss et al. |
| 5,282,958 A | 2/1994 | Santilli et al. |
| 5,362,378 A | 11/1994 | Borghard et al. |
| 5,652,201 A | 7/1997 | Papay et al. |
| 5,763,374 A | 6/1998 | Sakai et al. |
| 5,955,405 A | 9/1999 | Liesen et al. |
| 6,077,455 A | 6/2000 | Bloch et al. |
| 6,090,989 A | 7/2000 | Trewella et al. |
| 6,383,366 B1 | 5/2002 | Riley et al. |
| 6,602,402 B1 | 8/2003 | Benazzi et al. |
| 7,285,206 B2 | 10/2007 | Germaine |
| 7,867,957 B2 | 1/2011 | Matsui et al. |
| 2001/0056044 A1 | 12/2001 | Kinker et al. |
| 2002/0119896 A1 | 8/2002 | Yagishita et al. |
| 2003/0036488 A1 | 2/2003 | Yuki et al. |
| 2003/0104955 A1 | 6/2003 | Yuki et al. |
| 2003/0162673 A1 | 8/2003 | Kurihara et al. |
| 2003/0226785 A1 | 12/2003 | Murphy et al. |
| 2004/0045868 A1 | 3/2004 | Germaine |
| 2004/0065588 A1 | 4/2004 | Genetti et al. |
| 2004/0077509 A1 | 4/2004 | Yuki et al. |
| 2004/0079675 A1 | 4/2004 | Germaine |
| 2004/0092409 A1 | 5/2004 | Liesen et al. |
| 2004/0099571 A1 | 5/2004 | Germaine |
| 2004/0108249 A1 | 6/2004 | Cody et al. |
| 2004/0112792 A1 | 6/2004 | Murphy et al. |
| 2004/0119046 A1 | 6/2004 | Carey et al. |
| 2004/0129603 A1 | 7/2004 | Fyfe et al. |
| 2004/0154957 A1 | 8/2004 | Keeney et al. |
| 2004/0154958 A1 | 8/2004 | Alexander et al. |
| 2004/0198616 A1 | 10/2004 | Hirao et al. |
| 2004/0224860 A1 | 11/2004 | Baba et al. |
| 2005/0077209 A1 | 4/2005 | Miller et al. |
| 2005/0221998 A1 | 10/2005 | Marumo et al. |
| 2006/0027486 A1 | 2/2006 | Rosenbaum et al. |
| 2006/0052252 A1 | 3/2006 | Wedlock |
| 2006/0172900 A1 | 8/2006 | Yagishita et al. |

(Continued)

FOREIGN PATENT DOCUMENTS

CA   2 682 660   10/2008
CN   1279708    1/2001

(Continued)

OTHER PUBLICATIONS

Notification of Information Provision issued with respect to Japanese Patent Application No. 2009-135369, mailed May 29, 2012.
Notification of Information Provision issued with respect to Japanese Patent Application No. 2009-135444, mailed Jun. 19, 2012.
Office Action issued with respect to Japanese Patent Application No. 2008-006024, mailed Dec. 4, 2012.
Search Report issued with respect to European Patent Application No. 12002743.8, mailed Aug. 16, 2012.

(Continued)

*Primary Examiner* — James Goloboy
*Assistant Examiner* — Francis C Campanell
(74) *Attorney, Agent, or Firm* — Greenblum & Bernstein, P.L.C.

(57) ABSTRACT

A hydrocarbon-based lubricating base oil wherein a urea adduct value is not greater than 4% by mass, a viscosity index is 100 or higher, an average of carbon atoms number is 23-31 as determined by gas chromatography distillation, a value obtained by dividing an integral value of a peak in 30 ppm by an integral value of total peaks in the range of from 0 ppm to 50 ppm for the $^{13}$C-NMR spectrum is 0.1-0.2, and a product of a value obtained by dividing an integral value of peaks attributed to tertiary carbon atoms by an integral value of total peaks in the range of from 0 ppm to 50 ppm for the $^{13}$C-NMR spectrum, and the average of carbon atoms number, is 1.8-2.5.

14 Claims, No Drawings

(56) References Cited

U.S. PATENT DOCUMENTS

| | | |
|---|---|---|
| 2006/0205610 A1 | 9/2006 | Rosenbaum et al. |
| 2007/0032392 A1 | 2/2007 | Yokoyama et al. |
| 2007/0138032 A1 | 6/2007 | Agarkov |
| 2007/0138052 A1 | 6/2007 | Kobayashi et al. |
| 2007/0191239 A1 | 8/2007 | Matsuoka et al. |
| 2007/0238627 A1 | 10/2007 | Haire et al. |
| 2007/0287643 A1 | 12/2007 | Matsui et al. |
| 2008/0015400 A1 | 1/2008 | Matsui et al. |
| 2008/0029430 A1 | 2/2008 | Loh et al. |
| 2008/0029431 A1 | 2/2008 | Alexander et al. |
| 2008/0110799 A1 | 5/2008 | Matsui et al. |
| 2008/0248981 A1 | 10/2008 | Matsui et al. |
| 2009/0005278 A1 | 1/2009 | Takeuchi et al. |
| 2009/0075852 A1 | 3/2009 | Yagishita et al. |
| 2009/0221461 A1 | 9/2009 | Visger et al. |
| 2009/0312208 A1 | 12/2009 | Ishikawa et al. |
| 2010/0016195 A1 | 1/2010 | Shirahama et al. |
| 2010/0035777 A1 | 2/2010 | Sano et al. |
| 2010/0041572 A1 | 2/2010 | Sano et al. |
| 2010/0093578 A1 | 4/2010 | Tsujimoto et al. |
| 2010/0130395 A1 | 5/2010 | Tagawa et al. |
| 2010/0144571 A1 | 6/2010 | Shirahama et al. |
| 2010/0190671 A1 | 7/2010 | Stoehr et al. |
| 2011/0003725 A1 | 1/2011 | Matsui et al. |
| 2011/0021394 A1 | 1/2011 | Nakao et al. |
| 2011/0042267 A1 | 2/2011 | Hayasaka |
| 2011/0049008 A1 | 3/2011 | Tagawa et al. |
| 2011/0049009 A1 | 3/2011 | Tagawa et al. |
| 2011/0053815 A1 | 3/2011 | Matsui et al. |
| 2011/0065618 A1 | 3/2011 | Tagawa |
| 2011/0124536 A1 | 5/2011 | Matsui |
| 2011/0218131 A1 | 9/2011 | Tsujimoto et al. |
| 2011/0230685 A1 | 9/2011 | Tagawa |
| 2011/0237477 A1 | 9/2011 | Tagawa et al. |
| 2011/0306530 A1 | 12/2011 | Manabe et al. |
| 2012/0071373 A1 | 3/2012 | Matsui et al. |
| 2012/0071374 A1 | 3/2012 | Yaguchi et al. |
| 2012/0071375 A1 | 3/2012 | Yaguchi et al. |
| 2012/0135900 A1 | 5/2012 | Matsui et al. |
| 2012/0157361 A1 | 6/2012 | Mutou et al. |

FOREIGN PATENT DOCUMENTS

| | | |
|---|---|---|
| CN | 1317368 | 10/2001 |
| CN | 1751115 | 3/2006 |
| CN | 101065469 | 10/2007 |
| CN | 101213277 | 7/2008 |
| CN | 101426879 | 5/2009 |
| EP | 1 749 876 | 2/2007 |
| EP | 1 808 476 | 7/2007 |
| EP | 1 845 151 | 10/2007 |
| EP | 2 011 855 | 8/2008 |
| EP | 2 009 074 | 12/2008 |
| EP | 2 009 704 | 12/2008 |
| EP | 2 011 854 | 1/2009 |
| EP | 2 112 217 | 10/2009 |
| EP | 2135928 | 12/2009 |
| EP | 2 241 611 | 10/2010 |
| EP | 2264131 | 12/2010 |
| EP | 2264133 | 12/2010 |
| EP | 2 319 908 | 5/2011 |
| GB | 2407100 | 4/2005 |
| JP | S30-000624 | 2/1955 |
| JP | S31-003928 | 5/1956 |
| JP | S45-019183 | 7/1970 |
| JP | S48-025003 | 4/1973 |
| JP | 63-223094 | 9/1988 |
| JP | S63-309592 | 12/1988 |
| JP | 3-100099 | 4/1991 |
| JP | 4-030391 | 2/1992 |
| JP | 4-036391 | 2/1992 |
| JP | 4-068082 | 3/1992 |
| JP | 4-120193 | 4/1992 |
| JP | H5-508876 | 12/1993 |
| JP | 6-145258 | 5/1994 |
| JP | 6-306384 | 11/1994 |
| JP | 7-048421 | 2/1995 |
| JP | 7-062372 | 3/1995 |
| JP | 8-183988 | 7/1996 |
| JP | 8-302378 | 11/1996 |
| JP | 9-003463 | 1/1997 |
| JP | 2000-063439 | 2/2000 |
| JP | 2000-63877 | 2/2000 |
| JP | 2000-345170 | 12/2000 |
| JP | 2000-345171 | 12/2000 |
| JP | 2001-514301 | 9/2001 |
| JP | 2001-279278 | 10/2001 |
| JP | 2001-279287 | 10/2001 |
| JP | 2002-503754 | 2/2002 |
| JP | 2002-503755 | 2/2002 |
| JP | 2002-129182 | 5/2002 |
| JP | 2002-521499 | 7/2002 |
| JP | 2002-302687 | 10/2002 |
| JP | 2004-10799 | 1/2004 |
| JP | 2004-124080 | 4/2004 |
| JP | 2004-169029 | 6/2004 |
| JP | 2004-526831 | 9/2004 |
| JP | 2004-528426 | 9/2004 |
| JP | 2005-154760 | 6/2005 |
| JP | 2005-171186 | 6/2005 |
| JP | 2005-213447 | 8/2005 |
| JP | 2005-290238 | 10/2005 |
| JP | 2005-530902 | 10/2005 |
| JP | 2006-502297 | 1/2006 |
| JP | 2006-502298 | 1/2006 |
| JP | 2006-045277 | 2/2006 |
| JP | 2006-509899 | 3/2006 |
| JP | 2006-219642 | 8/2006 |
| JP | 2006-518395 | 8/2006 |
| JP | 2006-241436 | 9/2006 |
| JP | 2006-241437 | 9/2006 |
| JP | 2006-521416 | 9/2006 |
| JP | 2006-274209 | 10/2006 |
| JP | 2006-117851 | 11/2006 |
| JP | 2006-117853 | 11/2006 |
| JP | 2007-016172 | 1/2007 |
| JP | 2007-45850 | 2/2007 |
| JP | 2007-217494 | 8/2007 |
| JP | 2007-246659 | 9/2007 |
| JP | 2007-246661 | 9/2007 |
| JP | 2007-246662 | 9/2007 |
| JP | 2007-262239 | 10/2007 |
| JP | 2007-269885 | 10/2007 |
| JP | 2007-270059 | 10/2007 |
| JP | 2007-270062 | 10/2007 |
| JP | 2007-284635 | 11/2007 |
| JP | 2007-297528 | 11/2007 |
| JP | 2007-326963 | 12/2007 |
| JP | 2008-013281 | 1/2008 |
| JP | 2008-13681 | 1/2008 |
| JP | 2008-013684 | 1/2008 |
| JP | 2008-031459 | 2/2008 |
| JP | 2008-509244 | 3/2008 |
| JP | 2008-120908 | 5/2008 |
| JP | 2008-120909 | 5/2008 |
| JP | 2008-184569 | 8/2008 |
| JP | 2008-231189 | 10/2008 |
| JP | 2008-231190 | 10/2008 |
| JP | 2008-231191 | 10/2008 |
| JP | 2008-274236 | 11/2008 |
| JP | 2008-274237 | 11/2008 |
| JP | 2008-274238 | 11/2008 |
| JP | 2008-303344 | 12/2008 |
| JP | 2009-096925 | 5/2009 |
| JP | 2009-167278 | 7/2009 |
| JP | 2009-074068 | 9/2009 |
| JP | 2010-532805 | 10/2010 |
| WO | 9603359 | 2/1996 |
| WO | 99/41334 | 8/1999 |
| WO | 02/070629 | 9/2002 |
| WO | 2005/037967 | 4/2005 |
| WO | 2005/090528 | 9/2005 |
| WO | 2006/043709 | 4/2006 |

(56) References Cited

FOREIGN PATENT DOCUMENTS

| WO | 2006/055901 | 5/2006 |
|---|---|---|
| WO | 2007/001000 | 1/2007 |
| WO | 2007/105769 | 9/2007 |
| WO | 2007/114132 | 10/2007 |
| WO | 2007/114260 | 10/2007 |
| WO | 2007/116759 | 10/2007 |
| WO | 2007/119299 | 10/2007 |
| WO | 2007/123266 | 11/2007 |
| WO | 2007/133999 | 11/2007 |
| WO | 2008/072526 | 6/2008 |
| WO | 2008/093446 | 8/2008 |
| WO | 2008/123246 | 10/2008 |
| WO | 2008/123249 | 10/2008 |
| WO | 2009/007147 | 1/2009 |
| WO | 2009/072524 | 6/2009 |
| WO | 2009/090921 | 7/2009 |
| WO | 2009/119505 | 10/2009 |
| WO | 2010/041689 | 4/2010 |
| WO | 2010/041692 | 4/2010 |

OTHER PUBLICATIONS

Search Report issued with respect to European Patent Application No. 12002744.6, mailed Aug. 16, 2012.
Office Action issued with respect to Indonesian Patent Application No. W00201003649, mailed Aug. 23, 2012.
Search Report issued with respect to European Patent Application No. 10783178.6, mailed Oct. 29, 2012.
English-language translation of International Preliminary Report on Patentability issued with respect to PCT/JP2009/055666, mailed Nov. 18, 2010.
English-language translation of International Preliminary Report on Patentability issued with respect to PCT/JP2009/055690, mailed Nov. 18, 2010.
Notification of Information Provision issued with respect to Japanese Patent Application No. 2008-261071, mailed Oct. 9, 2012.
Notification of Information Provision issued with respect to Japanese Patent Application No. 2008-261079, mailed Oct. 9, 2012.
Office Action issued with respect to patent family member Chinese Patent Application No. 200980149130.9, mailed Dec. 4, 2012.
Office Action issued with respect to Chinese Patent Application No. 201080024425.6, mailed Dec. 12, 2012.
Search report from International Search Report (PCT/ISA/210), mail date is Dec. 28, 2009.
Search report from International Preliminary Report on Patentability and Written Opinion (PCT/IB/373 and PCT/ISA/237), mail date is May 17, 2011.
"The Advent of Modern Hydroprocessing—The Evolution of Base Oil Technology—Part 2", Machinery Lubirication (Retrieved from: http://www.machinerylubrication.com/Read/493/base-oil-technology on May 14, 2012), May 1, 2003, XP55027093.
Search report from E.P.O. that issued with respect to European Patent Application No. 09819126 5, mailed May 23, 2012.
Search report from E.P.O. that issued with respect to counterpart European Patent Application No. 09819223.0, mailed May 23, 2012.
Office Action issued with respect to U.S. Appl. No. 12/812,524, mailed Jan. 22, 2013.
E.P.O. Office action that issued with respect to European Patent Application No. 09723908.1, mailed Mar. 2, 2012.
English-language translation of International Preliminary Report on Patentability for PCT/JP2009/0067163, mailed May 26, 2011.
English-language translation of International Preliminary Report on Patentability for PCT/JP2009/055667, mailed Nov. 18, 2010.
English-language translation of International Preliminary Report on Patentability for PCT/JP2009/067509, mailed May 26, 2011.
English-language translation of International Preliminary Report on Patentability for PCT/JP2010/050916, mailed Jan. 26, 2012.
English-language translation of International Preliminary Report on Patentability for PCT/JP2010/050921, mailed Jan. 26, 2012.
English-language translation of International Preliminary Report on Patentability for PCT/JP2010/057957, mailed Jan. 26, 2012.
English-language translation of International Preliminary Report on Patentability for PCT/JP2010/059196, mailed Jan. 26, 2012.
English-language translation of International Preliminary Report on Patentability for PCT/JP2010/064698, mailed Mar. 29, 2012.
International Search Report for PCT/JP2009/055667, mailed Jun. 16, 2009.
International Search Report for PCT/JP2010/050916, mailed Apr. 13, 2010.
International Search Report for PCT/JP2010/050921, mailed Apr. 6, 2010.
International Search Report for PCT/JP2010/057957, mailed Aug. 17, 2010.
International Search Report for PCT/JP2010/059196, mailed Aug. 31, 2010.
International Search Report for PCT/JP2010/064698 (English and Japanese), mailed Nov. 2, 2010.
J.P.O. Notification of Information Provision issued with respect to Japanese Patent Application No. 2008-078224, mailed May 15, 2012.
E.P.O. Search Report issued with respect to European Patent Application No. 09723908.1, mailed Jun. 29, 2011.
Sharma et al., "Predicting Low Temperature Lubricant Rheology Using Nuclear Magnetic Resonance Spectroscopy and Mass Spectrometry", Tribology Letters, vol. 16, No. 1-2, Feb. 2004, pp. 11-19.
Shinya Sato et al., "Separation of n-Paraffin and 1-Olefin in Shale Oil by Urea Adduct Method", Sekiyu Gakkaishi, vol. 39, No. 5, 1996, pp. 365-368 with partial English language translation.
English-language translation of International Preliminary Report on Patentability for PCT/JP2009/050233, mailed Jul. 29, 2010.
E.P.O. Search Report issued with respect to European Patent Application No. 09819226.3, mailed Jun. 21, 2012.
J.P.O. Notification of Information Provision issued with respect to Japanese Patent Application No. 2008-078570, mailed May 22, 2012.
E.P.O. Search Report issued with respect to European Patent Application No. 09701700.8, mailed Jul. 5, 2012.
Office Action issued with respect to U.S. Appl. No. 12/812,524, mailed Aug. 28, 2012.
Office Action issued with respect to Chinese Patent Application No. 200980110123.8, mailed Aug. 31, 2012.
Office Action issued with respect to Chinese Patent Application No. 200980110437.8, mailed Aug. 31, 2012.
Office Action issued with respect to European Patent Application No. 09723908.1, mailed Sep. 12, 2012.
Zimmerschied et al., "Crystalline Adducts of Urea with Linear Aliphatic Compounds", Industrial and Engineering Chemistry 42(7), Jul. 31, 1950, pp. 1300-1306.
Rowe et al., "Low-Temperature Performance Advantages for Oils Using Hydrodewaxed Base Stocks", SAE Technical Paper Series 831715, Jan. 1, 1983, pp. 1-14.
Speight, "Hydrocarbons from Petroleum", Handbook of Industrial Hydrocarbon Processes, Jan. 1, 2011, pp. 85-126.
Office Action issued with respect to Chinese Patent Application No. 201080024832.7, mailed Dec. 12, 2012.
Search Report issued with respect to European Patent Application No. 10783230.5, mailed Feb. 11, 2013.
Search Report issued with respect to European Patent Application No. 12008549.3, mailed Feb. 11, 2013.
Office Action issued with respect to U.S. Appl. No. 13/122,828, mailed Feb. 28, 2013.
Office Action issued with respect to U.S. Appl. No. 12/934,374, mailed Mar. 25, 2013.
Office Action issued with respect to U.S. Appl. No. 13/122,622, mailed Mar. 22, 2013.
Office Action issued with respect to Chinese Patent Application No. 200980110123.8, mailed Apr. 1, 2013.
Schiessler et al., "Urea and Thiourea Adduction of C5-C42—Hydrocarbons", Journal of the American Chemical Society, vol. 74, No. 7, Apr. 5, 1952, pp. 1720-1723.
Notification of Information Provision issued with respect to patent family member Japanese Patent Application No. P2008-006024, mailed May 14, 2013.

(56) References Cited

OTHER PUBLICATIONS

Hiroshi Ohtsuka et al., "Separation of Straight—Chain Hydrocarbons from Petroleum Fractions by Means of Urea—Adduct Formation", Bulletin of the Faculty of Engineering, Hokkaido University, 40, Mar. 30, 1966, pp. 125-137, along with a partial English-language translation.

Yozo Oshima et al., "Monomethylparaffins in n—Paraffins Adducted from Petroleum Fractions", Sekiyu Gakkaishi, vol. 18, No. 6, 1975, pp. 497-502, along with a partial English-language translation.

Notification of Information Provision issued with respect to Japanese Patent App. No. 2008-261079, mailed Mar. 12, 2013.

Japanese Office Action issued with respect to Japanese Application No. 2008-261079, dated May 21, 2013.

Japanese Office Action issued with respect to Japanese Patent Application No. 2008-261070, dated Jul. 2, 2013.

Japanese Office Action issued wtih respect to Japanese Patent Application No. 2009-135369, dated Jul. 16, 2013.

Notification of Information Provision in relation to European Appl. No. 09819223.0, dated Sep. 13, 2013.

Notification of Information Provision in relation to Japanese Appl. No. P2008-261071, dated Dec. 3, 2013.

LUBRICANT BASE OIL AND A PROCESS FOR PRODUCING THE SAME, AND LUBRICATING OIL COMPOSITION

TECHNICAL FIELD

The present invention relates to a lubricating base oil, a process for producing it, and a lubricating oil composition.

BACKGROUND ART

In the field of lubricating oils, additives such as pour point depressants have conventionally been added to lubricating base oils including highly refined mineral oils, to improve the properties such as the low-temperature viscosity characteristics of the lubricating oils (see Patent documents 1-3, for example). Known methods for producing high-viscosity-index base oils include methods in which feed stock oils containing natural or synthetic normal paraffins are subjected to lubricating base oil refining by hydrocracking/hydroisomerization (see Patent documents 4-6, for example).

The properties evaluated for the low-temperature viscosity characteristics of lubricating base oils and lubricating oils are generally the pour point, clouding point and freezing point. Methods are also known for evaluating the low-temperature viscosity characteristics for lubricating base oils according to their normal paraffin or isoparaffin contents.

The purpose of using lubricating oils in internal combustion engines, gearboxes and other mechanical devices is to produce smoother functioning in such devices. Internal combustion engine lubricating oils (engine oils), in particular, must exhibit high performance under the high-performance, high-output and harsh operating conditions of internal combustion engines. Various additives such as anti-wear agents, metal-based detergents, ashless dispersants and antioxidants are therefore added to conventional engine oils to meet such performance demands.

The fuel efficiency performance required of lubricating oils has continued to increase in recent years, and this has led to application of various high-viscosity-index base oils or friction modifiers (see Patent document 7, for example).

CITATION LIST

Patent Literature

[Patent document 1] Japanese Unexamined Patent Application Publication HEI No. 4-36391
[Patent document 2] Japanese Unexamined Patent Application Publication HEI No. 4-68082
[Patent document 3] Japanese Unexamined Patent Application Publication HEI No. 4-120193
[Patent document 4] Japanese Unexamined Patent Application Publication No. 2005-154760
[Patent document 5] Japanese Patent Public Inspection No. 2006-502298
[Patent document 6] Japanese Patent Public Inspection No. 2002-503754
[Patent document 7] Japanese Unexamined Patent Application Publication HEI No. 06-306384

SUMMARY OF INVENTION

Technical Problem

However, with demands increasing in recent years for improved low-temperature viscosity characteristics of lubricating oils and also both low-temperature viscosity characteristics and viscosity-temperature characteristics, it has been difficult to completely satisfy such demands even when using lubricating base oils judged to have satisfactory low-temperature performance based on conventional evaluation standards.

Including additives in lubricating base oils can result in some improvement in the properties, but this approach has had its own restrictions. Pour point depressants, in particular, do not exhibit effects proportional to the amounts in which they are added, and even reduce shear stability when added in large amounts.

It has also been attempted to optimize the conditions for hydrocracking/hydroisomerization in refining processes for lubricating base oils that make use of hydrocracking/hydroisomerization as mentioned above, from the viewpoint of increasing the isomerization rate from normal paraffins to isoparaffins and improving the low-temperature viscosity characteristic by lowering the viscosity of the lubricating base oil, but because the viscosity-temperature characteristic (especially the viscosity characteristic at high temperatures) and the low-temperature viscosity characteristic are in an inverse relationship, it has been extremely difficult to achieve both of these. For example, increasing the isomerization rate from normal paraffins to isoparaffins improves the low-temperature viscosity characteristic but results in an unsatisfactory viscosity-temperature characteristic, including a reduced viscosity index. The fact that the above-mentioned indexes such as pour point and freezing point are often unsuitable as indexes for evaluating the low-temperature viscosity characteristic of lubricating base oils is another factor that impedes optimization of the hydrocracking/hydroisomerization conditions.

It is a first object of the invention to provide a lubricating base oil capable of exhibiting high levels of both viscosity-temperature characteristic and low-temperature viscosity characteristic, as well as a process for its production, and a lubricating oil composition comprising the lubricating base oil.

Conventional lubricating oils are still in need of improvement in terms of fuel efficiency and low-temperature viscosity characteristics.

Common methods known for achieving fuel efficiency involve reducing the kinematic viscosity of the product or increasing the viscosity index, i.e. multigrading by a combination of reducing the base oil viscosity and adding viscosity index improvers. However, lowering product viscosity and reducing base oil viscosity can lower the lubricating performance under harsh lubrication conditions (high-temperature, high-shear conditions), resulting in abrasion wear and seizing, as well as leading to problems such as fatigue fracture. To prevent such problems and maintain durability it is necessary to maintain high-temperature high-shear viscosity (HTHS viscosity). That is, for further fuel efficiency while maintaining practical performance, it is important to maintain the HTHS viscosity at 150° C. and to lower the kinematic viscosity at 40° C. and 100° C. and the HTHS viscosity at 100° C., to increase the viscosity index.

On the other hand, if only the low-temperature performance such as CCS viscosity or MRV viscosity is to be improved, it is sufficient to reduce the kinematic viscosities at 40° C. and 100° C. or accomplish multigrading by adding a viscosity index improver while lowering the base oil viscosity. However, lowering product viscosity and reducing base oil viscosity can lower the lubricating performance under harsh lubrication conditions (high-temperature, high-shear conditions), resulting in abrasion wear and seizing, as well as leading to problems such as fatigue fracture. These problems can be eliminated to some degree by their use in combination with synthetic oils such as poly-α-olefin-based base oils or esteric base oils, or lubricating base oils with excellent low-temperature viscosity, such as low-viscosity mineral base oils. However, such synthetic oils are expensive, while low-viscosity mineral base oils generally have low viscosity indexes and high NOACK evaporation. Consequently, adding such lubricating base oils increases the production cost of lubricating oils, or makes it difficult to achieve a high viscosity index and low evaporation properties. Moreover, only limited improvement in fuel efficiency can be achieved when these conventional lubricating base oils are used.

It is a second object of the invention to provide a lubricating oil composition that is superior in terms of fuel efficiency, low evaporation properties and low-temperature viscosity characteristic, and can exhibit fuel efficiency and both NOACK evaporation and low-temperature viscosity at −35° C. and below while maintaining high-temperature high-shear viscosity at 150° C., even without using a synthetic oil such as a poly-α-olefinic base oil or esteric base oil, or a low-viscosity mineral base oil, and in particular that can reduce the kinematic viscosity at 40° C. and 100° C. and the HTHS viscosity at 100° C., while also increasing the viscosity index and notably improving the CCS viscosity at −35° C. (MRV viscosity at −40° C.), of the lubricating oil.

Solution to Problem

The invention provides a hydrocarbon-based lubricating base oil wherein (i) a urea adduct value is not greater than 4% by mass, (ii) a viscosity index is 100 or higher, (iii) an average of carbon atoms number is 23-31 as determined by gas chromatography distillation, (iv) a value obtained by dividing an integral value of a peak in 30 ppm by an integral value of total peaks in the range of from 0 ppm to 50 ppm for the $^{13}$C-NMR spectrum is 0.1-0.2, and (v) a product of a value obtained by dividing an integral value of peaks attributed to tertiary carbon atoms by an integral value of total peaks in the range of from 0 ppm to 50 ppm for the $^{13}$C-NMR spectrum, and the average of carbon atoms number, is 1.8-2.5.

The "urea adduct value" according to the invention is measured by the following method. A 100 g weighed portion of sample oil (lubricating base oil) is placed in a round bottom flask, 200 g of urea, 360 ml of toluene and 40 ml of methanol are added and the mixture is stirred at room temperature for 6 hours. This produces white particulate crystals in the reaction mixture. The reaction mixture is filtered with a 1 micron filter to obtain the produced white particulate crystals, and the crystals are washed 6 times with 50 ml of toluene. The recovered white crystals are placed in a flask, 300 ml of purified water and 300 ml of toluene are added and the mixture is stirred at 80° C. for 1 hour. The aqueous phase is separated and removed with a separatory funnel, and the toluene phase is washed 3 times with 300 ml of purified water. After dewatering treatment of the toluene phase by addition of a desiccant (sodium sulfate), the toluene is distilled off. The proportion (mass percentage) of hydrocarbon component (urea adduct) obtained in this manner with respect to the sample oil is defined as the urea adduct value.

While efforts are being made to improve the isomerization rate from normal paraffins to isoparaffins in conventional refining processes for lubricating base oils by hydrocracking and hydroisomerization, as mentioned above, the present inventors have found that it is difficult to satisfactorily improve the low-temperature viscosity characteristic simply by reducing the residual amount of normal paraffins. That is, although the isoparaffins produced by hydrocracking and hydroisomerization also contain components that adversely affect the low-temperature viscosity characteristic, this fact has not been fully appreciated in the conventional methods of evaluation.

With measurement of the urea adduct value according to the invention, on the other hand, it is possible to accomplish precise and reliable collection of the components in isoparaffins that can adversely affect the low-temperature viscosity characteristic, as well as normal paraffins when normal paraffins are residually present in the lubricating base oil, as urea adduct, and it is therefore an excellent indicator for evaluation of the low-temperature viscosity characteristic of lubricating base oils. The present inventors have confirmed that when analysis is conducted using GC and NMR, the main urea adducts are urea adducts of normal paraffins and of isoparaffins having carbon atoms from a terminal carbon atom of a main chain to a point of branching of 6 or greater.

The "viscosity index" according to the invention, and the "kinematic viscosity at 40° C. or 100° C." mentioned hereunder, are the viscosity index and kinematic viscosity at 40° C. or 100° C. as measured according to JIS K 2283-1993.

The "average of carbon atoms number" according to the invention is determined by gas chromatography distillation, as mentioned above. Specifically, the lubricating base oil is subjected to gas chromatography distillation, and the carbon atom distribution and component ratio for each number of carbons in the lubricating base oil are measured with reference to a gas chromatogram for a mixture of normal paraffins measured under the same conditions. The cumulative product of the component ratio for each of carbon atoms number and the carbon atoms number was determined and recorded as the average of carbon atoms number. There are no particular restrictions on the method of gas chromatography distillation, but it is preferably carried out according to the "distillation property" measurement method (ASTM D 2887-97) described hereunder.

The phrases "a value obtained by dividing an integral value of a peak in 30 ppm by an integral value of total peaks in the range of from 0 ppm to 50 ppm for the $^{13}$C-NMR spectrum" and "a product of a value obtained by dividing the integral value of peaks attributed to tertiary carbon atoms by an integral value of total peaks in the range of from 0 ppm to 50 ppm for the $^{13}$C-NMR spectrum, and the average of carbon atoms number", will now be explained using the following formula (I). Formula (I) shows an example of the main part of a hydrocarbon molecule present in the lubricating base oil of the invention. In the formula, the carbon atoms of the main chain are denoted as β carbon atoms, γ carbon atoms and δ carbon atoms, in order of their distance from the carbon atoms to which the branched chains are bonded (α carbons), and the remaining carbon atoms are collectively referred to as ε carbon atoms.

The "value obtained by dividing an integral value of a peak in 30 ppm by an integral value of total peaks in the range of from 0 ppm to 50 ppm for the $^{13}$C-NMR spectrum", for the purpose of the invention, is an index of the ratio of ε carbon atoms of the carbon atoms constituting the hydrocarbon, and its value according to the invention must be 0.1-0.2.

[Chemical Formula 1]

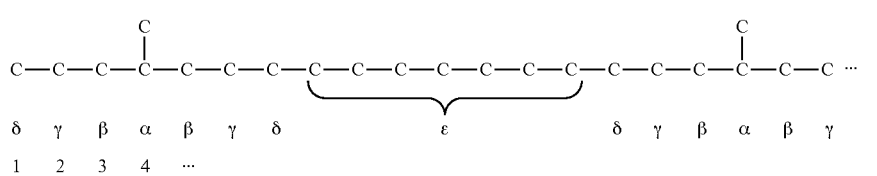

Also, the "product of a value obtained by dividing an integral value of peaks attributed to tertiary carbon atoms by an integral value of total peaks in the range of from 0 ppm to 50 ppm for the $^{13}$C-NMR spectrum, and the average of carbon atoms number", for the purpose of the invention, is the mean value of the ratio of tertiary carbon atoms of the total carbon atoms constituting the hydrocarbon molecules, and in a lubricating base oil of which the major part (for example, 80% by mass or greater) are composed of branched paraffins, such as the lubricating base oil used as an example of the invention, this can approach the mean value of the number of branches in the constituent hydrocarbon molecules. Consequently, the "product of a value obtained by dividing an integral value of peaks attributed to tertiary carbon atoms by an integral value of total peaks in the range of from 0 ppm to 50 ppm for the $^{13}$C-NMR spectrum, and the average of carbon atoms number", according to the invention, is considered to correspond to the mean value of the number of branches in the hydrocarbon molecules constituting the lubricating base oil of the invention, and it will be expressed as such hereunder. For the invention this value must be 1.8-2.5, and in a lubricating base oil composed primarily of branched paraffins, the average number of branches in an average hydrocarbon molecule is understood to be between 1.8 and 2.5.

A hydrocarbon-based lubricating base oil of the invention (also hereinafter referred to as "lubricating base oil of the invention") satisfies the aforementioned conditions (i)-(v) and therefore allows high levels of both viscosity-temperature characteristic and low-temperature viscosity characteristic to be obtained. When an additive such as a pour point depressant is added to the lubricating base oil of the invention, the effect of its addition is exhibited more effectively. Thus, the lubricating base oil of the invention is highly useful as a lubricating base oil that can meet recent demands in terms of both low-temperature viscosity characteristic and viscosity-temperature characteristic. In addition, according to the lubricating base oil of the invention it is possible to reduce viscous resistance and stirring resistance in a practical temperature range due to its aforementioned superior viscosity-temperature characteristic. In particular, the lubricating base oil of the invention can exhibit this effect by significantly reducing viscous resistance and stirring resistance under low temperature conditions of 0° C. and below, and it is therefore highly useful for reducing energy loss and achieving energy savings in devices in which the lubricating base oil is applied.

A preferred mode of the hydrocarbon-based lubricating base oil of the invention is a hydrocarbon-based lubricating base oil satisfying conditions (i), (ii), (iv) and (v) specified above, and also (iii-1) having an average of carbon atoms number of 27-31 (hereinafter referred to as "lubricating base oil (I)" for convenience).

In the lubricating base oil (I), the ratio of the tertiary carbon atoms within the fourth carbon atoms from a terminal carbon atom of a main chain is preferably at least 25% and less than 60% based on the total amount of tertiary carbon atoms. A tertiary carbon atom that is "within the fourth carbon atoms from a terminal carbon atom of a main chain" means that, counting the first carbon atom as the terminal carbon atom of the main chain, any of the 2nd to 4th carbon atoms counting from the terminal carbon atom is a tertiary carbon atom. For example, the 4th carbon atom from the left terminal carbon atom of the main chain in formula (I) (the α carbon atom) is a tertiary carbon atom which is "within the fourth carbon atoms from the terminal carbon atom of the main chain".

Another preferred mode of the hydrocarbon-based lubricating base oil of the invention is a hydrocarbon-based lubricating base oil satisfying conditions (i), (ii), (iv) and (v) specified above, and also (iii-2) having an average of carbon atoms number of at least 23 and less than 27 (hereinafter referred to as "lubricating base oil (II)" for convenience).

In the lubricating base oil (II), the ratio of the tertiary carbon atoms within the fourth carbon atoms from a terminal carbon atom of a main chain is preferably at least 25% and less than 70% based on the total amount of tertiary carbon atoms.

The lubricating base oil (II) preferably has a kinematic viscosity at 40° C. of not greater than 25 mm$^2$/s, a viscosity index of 120 or higher and a difference between a 90% distillation temperature and a 5% distillation temperature in value of not more than 75° C.

The invention further provides a method for producing a lubricating base oil which comprises a step of hydrocracking/hydroisomerization of a feed stock oil containing normal paraffins, so that (i) a urea adduct value of an obtained treated product is not greater than 4% by mass, (ii) a viscosity index is 100 or higher, (iii) an average of carbon atoms number is 23-31 as determined by gas chromatography distillation, (iv) a value obtained by dividing an integral value of a peak in 30 ppm by an integral value of total peaks in the range of from 0 ppm to 50 ppm for the $^{13}$C-NMR spectrum is 0.1-0.2, and (v) a product of a value obtained by dividing an integral value of peaks attributed to tertiary carbon atoms by an integral value of total peaks in the range of from 0 ppm to 50 ppm for the $^{13}$C-NMR spectrum, and the average of carbon atoms number, is 1.8-2.5.

According to the method for producing a lubricating base oil according to the invention, it is possible to reliably obtain a lubricating base oil with high levels of both viscosity-temperature characteristic and low-temperature viscosity characteristic, by hydrocracking/hydroisomerization of a feed stock oil containing normal paraffins so that an obtained treated product satisfies the aforementioned conditions (i)-(v).

The lubricating base oil (I) can be obtained if the average of carbon atoms number is 27-31 for the hydrocracking/hydroisomerization.

The lubricating base oil (II) can be obtained if the average of carbon atoms number is at least 23 and less than 27 for the hydrocracking/hydroisomerization.

The invention still further provides a lubricating oil composition comprising the aforementioned hydrocarbon-based lubricating base oil of the invention.

Since a lubricating oil composition according to the invention contains a hydrocarbon-based lubricating base oil of the invention having the excellent properties described above, it is useful as a lubricating oil composition capable of exhibiting high levels of both viscosity-temperature characteristic and low-temperature viscosity characteristic. Since the effects of adding additives to the hydrocarbon-based lubricating base oil of the invention can be effectively exhibited, as explained above, various additives may be optimally added to the lubricating oil composition of the invention.

A preferred mode of the lubricating oil composition of the invention is a lubricating oil composition further comprising a viscosity index improver, and having a kinematic viscosity at 100° C. of 4-12 mm$^2$/s and a viscosity index of 140-300 (hereinafter referred to as "lubricating oil composition (III) for convenience).

The viscosity index improver is preferably a poly(meth)acrylate-based viscosity index improver.

Preferably, the PSSI of the poly(meth)acrylate-based viscosity index improver is not greater than 40, and the ratio of the weight-average molecular weight and the PSSI of the poly(meth)acrylate-based viscosity index improver is at least $1 \times 10^4$.

Also, the ratio of the HTHS viscosity at 100° C. with respect to the HTHS viscosity at 150° C. in the lubricating oil composition (III) preferably satisfies the condition represented by the following inequality (A):

$$\text{HTHS}(100° \text{ C.})/\text{HTHS}(150° \text{ C.}) \leq 2.04 \tag{A},$$

wherein HTHS (100° C.) represents the HTHS viscosity at 100° C. and HTHS (150° C.) represents the HTHS viscosity at 150° C.

Advantageous Effects of Invention

According to the invention there are provided a lubricating base oil capable of exhibiting high levels of both viscosity-temperature characteristic and low-temperature viscosity characteristic, as well as a process for its production, and a lubricating oil composition comprising the lubricating base oil.

The lubricating oil composition (III) of the invention is superior in terms of fuel efficiency, low evaporation properties and low-temperature viscosity characteristic, and can exhibit fuel efficiency and both NOACK evaporation and low-temperature viscosity at −35° C. and below while maintaining HTHS viscosity at 150° C., even without using a synthetic oil such as a poly-α-olefinic base oil or enteric base oil, or a low-viscosity mineral base oil, and in particular it can reduce the kinematic viscosity at 40° C. and 100° C. and the HTHS viscosity at 100° C., while also notably improving the CCS viscosity at −35° C. (MRV viscosity at −40° C.), of the lubricating oil.

The lubricating oil composition (III) is also useful for gasoline engines, diesel engines and gas engines for two-wheel vehicles, four-wheel vehicles, electric power generation and cogeneration, while it can be suitably used not only for such engines that run on fuel with a sulfur content of not greater than 50 ppm by mass, but also for marine engines, outboard motor engines and the like. Because of its excellent viscosity-temperature characteristic, the lubricating oil composition of the invention is particularly effective for increasing fuel efficiency of engines having roller tappet-type valve gear systems.

DESCRIPTION OF EMBODIMENTS

Preferred embodiments of the invention will now be described in detail.

First Embodiment

Lubricating Base Oil

The lubricating base oil of the first embodiment of the invention is a hydrocarbon-based lubricating base oil wherein (i) the urea adduct value is not greater than 4% by mass, (ii) the viscosity index is 100 or higher, (iii) the average of carbon atoms number is 23-31 as determined by gas chromatography distillation, (iv) the value obtained by dividing an integral value of a peak in 30 ppm by an integral value of total peaks in the range of from 0 ppm to 50 ppm for the $^{13}$C-NMR spectrum (hereinafter referred to as "ε methylene carbon ratio") is 0.1-0.2, and (v) the product of the value obtained by dividing the integral value of peaks attributed to tertiary carbon atoms by an integral value of total peaks in the range of from 0 ppm to 50 ppm for the $^{13}$C-NMR spectrum, and the average of carbon atoms number (hereinafter referred to as "average branching number") is 1.8-2.5.

From the viewpoint of improving the low-temperature viscosity characteristic without impairing the viscosity-temperature characteristic, the urea adduct value of the lubricating base oil of this embodiment must be not greater than 4% by mass as mentioned above, but it is preferably not greater than 3.5% by mass, more preferably not greater than 3% by mass and even more preferably not greater than 2.5% by mass. The urea adduct value of the lubricating base oil may even be 0% by mass. However, it is preferably 0.1% by mass or greater, more preferably 0.5% by mass or greater and most preferably 0.8% by mass or greater, from the viewpoint of obtaining a lubricating base oil with a sufficient low-temperature viscosity characteristic and a higher viscosity index, and also of relaxing the dewaxing conditions for increased economy.

From the viewpoint of the viscosity-temperature characteristic, the viscosity index of the lubricating base oil of this embodiment must be 100 or higher as mentioned above. For a lubricating base oil (iii-1) having an average of 27-31 carbon atoms (lubricating base oil (I)), the viscosity index is preferably 120 or higher, more preferably 130 or higher, even more preferably 135 or higher and most preferably 140 or higher from the viewpoint of the viscosity-temperature characteristic, and it is also preferably not higher than 170, more preferably not higher than 160 and even more preferably not higher than 155 from the viewpoint of low-temperature characteristics. For a lubricating base oil (iii-2) having an average of greater than 23 and less than 27 carbon atoms (lubricating base oil (II)), the viscosity index is preferably 110 or higher, more preferably 120 or higher, even more preferably 125 or higher and most preferably 128 or higher from the viewpoint of the viscosity-temperature characteristic, and it is also preferably not higher than 150, more preferably not higher than 140 and even more preferably not higher than 135 from the viewpoint of low-temperature characteristics.

The ε methylene carbon ratio of the lubricating base oil of this embodiment must be 0.1-0.2, as mentioned above. For the lubricating base oil (I), the ε methylene carbon ratio is preferably 0.12-0.19, more preferably 0.14-0.18 and even more preferably 0.15-0.18. For the lubricating base oil (II), the ε methylene carbon ratio is preferably 0.12-0.18, more preferably 0.125-0.16 and even more preferably 0.125-0.15. If the ε methylene carbon ratio exceeds these upper limits the low-temperature flow property will be insufficient, and if it is below the lower limits the viscosity-temperature characteristic will be insufficient. Limiting the $\epsilon$ methylene carbon ratio to 0.14-0.19 for the lubricating base oil (I) will allow a lubricating base oil with more excellent low-temperature characteristics (especially CCS viscosity at $-35°$ C.) to be obtained, and adding a pour point depressant will allow a lubricating oil composition with particularly excellent low-temperature characteristics (for example, MRV viscosity at $-40°$ C.) to be obtained. Limiting the $\epsilon$ methylene carbon ratio to 0.12-0.16 for the lubricating base oil (II) will in particular allow a lubricating base oil with low BF viscosity (for example, BF viscosity at $-30°$ C.) to be obtained.

The average branching number of the lubricating base oil of this embodiment must be 1.8-2.5 as mentioned above. For the lubricating base oil (I), the average branching number is preferably 2.0-2.4 and more preferably 2.05-2.35. For the lubricating base oil (II), the average branching number is preferably 1.8-2.4, more preferably 1.9-2.3 and even more preferably 2.0-2.2. If the average branching number is smaller than these lower limits, viscosity increase at low temperature will increase, or in other words, the low-temperature characteristics will be impaired. If the average branching number exceeds the upper limits, the viscosity index will be lowered and the base oil yield will be reduced. Limiting the average branching number of the lubricating base oil (I) to 2.0-2.4 will allow a lubricating base oil with more excellent low-temperature characteristics (for example, CCS viscosity at $-35°$ C. or BF viscosity at $-30°$ C.) to be obtained, and adding a pour point depressant will allow a lubricating oil composition with excellent low-temperature characteristics (for example, MRV viscosity at $-40°$ C.) to be obtained. Limiting the average branching number to 1.8-2.2 for the lubricating base oil (II) will allow a lubricating base oil with significantly low BF viscosity (for example, BF viscosity at $-30°$ C.) to be obtained.

In the lubricating base oil (I), preferably at least 25% and less than 60%, more preferably 30-50% and even more preferably 35-45% of the tertiary carbon atoms are within the forth carbon atoms from the terminal carbon atom of the main chain. In the lubricating base oil (II), preferably at least 25% and less than 70%, more preferably 30-60%, even more preferably 30-50% and yet more preferably 37-48% of the tertiary carbon atoms are within the fourth carbon atoms from the terminal carbon atom of the main chain. By satisfying this condition in addition to conditions (i)-(v), it will be possible to obtain a lubricating base oil having an excellent balance between low-temperature characteristics and viscosity-temperature characteristic.

The feed stock oil used for production of the lubricating base oil of this embodiment includes normal paraffins or normal paraffin-containing wax. The feed stock oil may be a mineral oil or a synthetic oil, or a mixture of two or more thereof.

The feed stock oil is preferably a wax-containing starting material that boils in the lubricating oil range specified by ASTM D86 or ASTM D2887. The wax content of the feed stock oil is preferably between 50% by mass and 100% by mass based on the total amount of the feed stock oil. The wax content of the starting material can be measured by a method of analysis such as nuclear magnetic resonance spectroscopy (ASTM D5292), correlative ring analysis (n-d-M) (ASTM D3238) or the solvent method (ASTM D3235).

Examples of wax-containing starting materials include oils derived from solvent refining methods, such as raffinates, partial solvent dewaxed oils, deasphalted oils, distillates, vacuum gas oils, coker gas oils, slack waxes, foot oil, Fischer-Tropsch waxes and the like, among which slack waxes and Fischer-Tropsch waxes are preferred.

Slack wax is typically derived from hydrocarbon starting materials by solvent or propane dewaxing. Slack waxes may contain residual oil, but the residual oil can be removed by deoiling. Foot oil corresponds to deoiled slack wax.

Fischer-Tropsch waxes are produced by so-called Fischer-Tropsch synthesis.

Commercial normal paraffin-containing feed stock oils are also available. Specifically, these include Paraflint 80 (hydrogenated Fischer-Tropsch wax) and Shell MDS Waxy Raffinate (hydrogenated and partially isomerized heart cut distilled synthetic wax raffinate).

Feed stock oil from solvent extraction is obtained by feeding a high boiling point petroleum fraction from atmospheric pressure distillation to a vacuum distillation apparatus and subjecting the distillation fraction to solvent extraction. The residue from vacuum distillation may also be depitched. In solvent extraction methods, the aromatic components are dissolved in the extract phase while leaving more paraffinic components in the raffinate phase. Naphthenes are distributed in the extract phase and raffinate phase. The preferred solvents for solvent extraction are phenols, furfurals and N-methylpyrrolidone. By controlling the solvent/oil ratio, extraction temperature and method of contacting the solvent with the distillate to be extracted, it is possible to control the degree of separation between the extract phase and raffinate phase. There may also be used as the starting material a bottom fraction obtained from a fuel oil hydrocracking apparatus, using a fuel oil hydrocracking apparatus with higher hydrocracking performance.

It is possible to reliably obtain a lubricating base oil of the invention by a step of hydrocracking/hydroisomerization of a feed stock oil until the obtained treated product satisfies the aforementioned conditions (i)-(v). The hydrocracking/hydroisomerization step is not particularly restricted so long as it satisfies the aforementioned conditions for the urea adduct value and viscosity index of the treated product. A preferred hydrocracking/hydroisomerization step according to the invention comprises a first step in which a normal paraffin-containing feed stock oil is subjected to hydrotreatment using a hydrotreatment catalyst, a second step in which the treated product from the first step is subjected to hydrodewaxing using a hydrodewaxing catalyst, and a third step in which the treated product from the second step is subjected to hydrorefining using a hydrorefining catalyst.

Conventional hydrocracking/hydroisomerization also includes a hydrotreatment step in an early stage of the hydrodewaxing step, for the purpose of desulfurization and denitrogenization to prevent poisoning of the hydrodewaxing catalyst. In contrast, the first step (hydrotreatment step) according to the invention is carried out to decompose a portion (for example, about 10% by mass and preferably 1-10% by mass) of the normal paraffins in the feed stock oil at an early stage of the second step (hydrodewaxing step), thus allowing desulfurization and denitrogenization in the first step as well, although the purpose differs from that of conventional hydrotreatment. The first step is preferred in order to reliably limit the urea adduct value of the treated product obtained after the third step (the lubricating base oil) to not greater than 4% by mass.

As hydrogenation catalysts to be used in the first step there may be mentioned catalysts containing Group 6 metals and Group 8-10 metals, as well as mixtures thereof. As preferred metals there may be mentioned nickel, tungsten, molybdenum and cobalt, and mixtures thereof. The hydrogenation catalyst may be used in a form with the aforementioned metals supported on a heat-resistant metal oxide support, and normally the metal will be present on the support as an oxide or sulfide. When a mixture of metals is used, it may be used as a bulk metal catalyst with an amount of metal of at least 30% by mass based on the total amount of the catalyst. The metal oxide support may be an oxide such as silica, alumina, silica-alumina or titania, with alumina being preferred. Preferred alumina is γ or β porous alumina. The loading amount of the metal is preferably 0.5-35% by mass based on the total amount of the catalyst. When a mixture of a metal of Groups 9-10 and a metal of Group 6 is used, preferably the metal of Group 9 or 10 is present in an amount of 0.1-5% by mass and the metal of Group 6 is present in an amount of 5-30% by mass based on the total amount of the catalyst. The loading amount of the metal may be measured by atomic absorption spectrophotometry or inductively coupled plasma emission spectroscopy, or the individual metals may be measured by other ASTM methods.

The acidity of the metal oxide support can be controlled by controlling the addition of additives and the nature of the metal oxide support (for example, controlling the amount of silica incorporated in a silica-alumina support). As examples of additives there may be mentioned halogens, especially fluorine, and phosphorus, boron, yttria, alkali metals, alkaline earth metals, rare earth oxides and magnesia. Co-catalysts such as halogens generally raise the acidity of metal oxide supports, while weakly basic additives such as yttria and magnesia can be used to lower the acidity of the support.

As regards the hydrotreatment conditions, the treatment temperature is preferably 150-450° C. and more preferably 200-400° C., the hydrogen partial pressure is preferably 1400-20,000 kPa and more preferably 2800-14,000 kPa, the liquid space velocity (LHSV) is preferably 0.1-10 $hr^{-1}$ and more preferably 0.1-5 $hr^{-1}$, and the hydrogen/oil ratio is preferably 50-1780 $m^3/m^3$ and more preferably 89-890 $m^3/m^3$. These conditions are only for example, and the hydrotreatment conditions in the first step may be appropriately selected for different starting materials, catalysts and apparatuses, in order to obtain the specified urea adduct value and viscosity index for the treated product obtained after the third step.

The treated product obtained by hydrotreatment in the first step may be directly supplied to the second step, but a step of stripping or distillation of the treated product and separating removal of the gas product from the treated product (liquid product) is preferably conducted between the first step and second step. This can reduce the nitrogen and sulfur contents in the treated product to levels that will not affect prolonged use of the hydrodewaxing catalyst in the second step. The main objects of separating removal by stripping and the like are gaseous contaminants such as hydrogen sulfide and ammonia, and stripping can be accomplished by ordinary means such as a flash drum, distiller or the like.

When the hydrotreatment conditions in the first step are mild, residual polycyclic aromatic components can potentially remain depending on the starting material used, and such contaminants may be removed by hydrorefining in the third step.

The hydrodewaxing catalyst used in the second step may contain crystalline or amorphous materials. As examples of crystalline materials there may be mentioned molecular sieves having 10- or 12-membered ring channels, composed mainly of aluminosilicates (zeolite) or silicoaluminophosphates (SAPO). Specific examples of zeolites include ZSM-22, ZSM-23, ZSM-35, ZSM-48, ZSM-57, ferrierite, ITQ-13, MCM-68, MCM-71 and the like. ECR-42 may be mentioned as an example of an aluminophosphate. Examples of molecular sieves include zeolite beta and MCM-68. Among the above there are preferably used one or more selected from among ZSM-48, ZSM-22 and ZSM-23, with ZSM-48 being particularly preferred. The molecular sieves are preferably hydrogen-type. Reduction of the hydrodewaxing catalyst may occur at the time of hydrodewaxing, but alternatively a hydrodewaxing catalyst that has been previously subjected to reduction treatment may be used for the hydrodewaxing.

Amorphous materials for the hydrodewaxing catalyst include alumina doped with Group 3 metals, fluorinated alumina, silica-alumina, fluorinated silica-alumina, silica-alumina and the like.

A preferred mode of the dewaxing catalyst is a bifunctional catalyst, i.e. one carrying a metal hydrogenated component which is at least one metal of Group 6, at least one metal of Groups 8-10 or a mixture thereof. Preferred metals are precious metals of Groups 9-10, such as Pt, Pd or mixtures thereof. Such metals are supported at preferably 0.1-30% by mass based on the total amount of the catalyst. The method for preparation of the catalyst and loading of the metal may be, for example, an ion-exchange method or impregnation method using a decomposable metal salt.

When molecular sieves are used, they may be compounded with a binder material that is heat resistant under the hydrodewaxing conditions, or they may be binderless (self-binding). As binder materials there may be mentioned inorganic oxides, including silica, alumina, silica-alumina, two-component combinations of silica with other metal oxides such as titania, magnesia, yttria and zirconia, and three-component combinations of oxides such as silica-alumina-yttria, silica-alumina-magnesia and the like. The amount of molecular sieves in the hydrodewaxing catalyst is preferably 10-100% by mass and more preferably 35-100% by mass based on the total amount of the catalyst. The hydrodewaxing catalyst may be formed by a method such as spray-drying or extrusion. The hydrodewaxing catalyst may be used in sulfided or non-sulfided form, although a sulfided form is preferred.

As regards the hydrodewaxing conditions, the temperature is preferably 250-400° C. and more preferably 275-350° C., the hydrogen partial pressure is preferably 791-20,786 kPa (100-3000 psig) and more preferably 1480-17,339 kPa (200-2500 psig), the liquid space velocity is preferably 0.1-10 $hr^{-1}$ and more preferably 0.1-5 $hr^{-1}$, and the hydrogen/oil ratio is preferably 45-1780 $m^3/m^3$ (250-10,000 scf/B) and more preferably 89-890 $m^3/m^3$ (500-5000 scf/B). These conditions are only for example, and the hydrodewaxing conditions in the second step may be appropriately selected for different starting materials, catalysts and apparatuses, in order to obtain the specified urea adduct value and viscosity index for the treated product obtained after the third step.

The treated product that has been hydrodewaxed in the second step is then supplied to hydrorefining in the third step. Hydrorefining is a form of mild hydrotreatment aimed at removing residual heteroatoms and color components while also saturating the olefins and residual aromatic compounds by hydrogenation. The hydrorefining in the third step may be carried out in a cascade fashion with the dewaxing step.

The hydrorefining catalyst used in the third step is preferably one comprising a Group 6 metal, a Group 8-10 metal or a mixture thereof supported on a metal oxide support. As preferred metals there may be mentioned precious metals, and especially platinum, palladium and mixtures thereof. When a mixture of metals is used, it may be used as a bulk metal catalyst with an amount of metal of 30% by mass or greater based on the amount of the catalyst. The metal content of the catalyst is preferably not greater than 20% by mass non-precious metals and preferably not greater than 1% by mass precious metals. The metal oxide support may be either an amorphous or crystalline oxide. Specifically, there may be mentioned low acidic oxides such as silica, alumina, silica-alumina and titania, with alumina being preferred. From the viewpoint of saturation of aromatic compounds, it is preferred to use a hydrorefining catalyst comprising a metal with a relatively powerful hydrogenating function supported on a porous support.

Preferred hydrorefining catalysts include meso-microporous materials belonging to the M41S class or line of catalysts. M41S line catalysts are meso-macroporous materials with high silica contents, and specific ones include MCM-41, MCM-48 and MCM-50. The hydrorefining catalyst has a pore size of 15-100 Å, and MCM-41 is particularly preferred. MCM-41 is an inorganic porous non-laminar phase with a hexagonal configuration and pores of uniform size. The physical structure of MCM-41 manifests as straw-like bundles with straw openings (pore cell diameters) in the range of 15-100 angstroms. MCM-48 has cubic symmetry, while MCM-50 has a laminar structure. MCM-41 may also have a structure with pore openings having different meso-microporous ranges. The meso-microporous material may contain metal hydrogenated components consisting of one or more Group 8, 9 or 10 metals, and preferred as metal hydrogenated components are precious metals, especially Group 10 precious metals, and most preferably Pt, Pd or their mixtures.

As regards the hydrorefining conditions, the temperature is preferably 150-350° C. and more preferably 180-250° C., the total pressure is preferably 2859–20,786 kPa (approximately 400-3000 psig), the liquid space velocity is preferably 0.1-5 $hr^{-1}$ and more preferably 0.5-3 $hr^{-1}$, and the hydrogen/oil ratio is preferably 44.5-1780 $m^3/m^3$ (250-10,000 scf/B). These conditions are only for example, and the hydrorefining conditions in the third step may be appropriately selected for different starting materials and treatment apparatuses, so that the urea adduct value and viscosity index for the treated product obtained after the third step satisfy the respective conditions specified above.

The treated product obtained after the third step may be subjected to distillation or the like as necessary for separating removal of certain components.

The lubricating base oil of this embodiment obtained by the production process described above is not restricted in terms of its other properties so long as the aforementioned conditions (i)-(v) are satisfied, but preferably also the conditions specified below are also satisfied.

The saturated component content of the lubricating base oil of this embodiment is preferably 90% by mass or greater, more preferably 93% by mass or greater and even more preferably 95% by mass or greater based on the total amount of the lubricating base oil. The proportion of cyclic saturated components among the saturated components is preferably 0.1-50% by mass, more preferably 0.5-40% by mass, even more preferably 1-30% by mass and most preferably 5-20% by mass. If the saturated component content and proportion of cyclic saturated components among the saturated components both satisfy these respective conditions, it will be possible to achieve adequate levels for the viscosity-temperature characteristic and heat and oxidation stability, while additives added to the lubricating base oil will be kept in a sufficiently stable dissolved state in the lubricating base oil, and it will be possible for the functions of the additives to be exhibited at a higher level. In addition, a saturated component content and proportion of cyclic saturated components among the saturated components satisfying the aforementioned conditions can improve the frictional properties of the lubricating base oil itself, resulting in a greater friction reducing effect and thus increased energy savings.

If the saturated component content is less than 90% by mass, the viscosity-temperature characteristic, heat and oxidation stability and frictional properties will tend to be inadequate. If the proportion of cyclic saturated components among the saturated components is less than 0.1% by mass, the solubility of the additives included in the lubricating base oil will be insufficient and the effective amount of additives kept dissolved in the lubricating base oil will be reduced, making it impossible to effectively achieve the function of the additives. If the proportion of cyclic saturated components among the saturated components is greater than 50% by mass, the efficacy of additives included in the lubricating base oil will tend to be reduced.

According to the invention, a proportion of 0.1-50% by mass cyclic saturated components among the saturated components is equivalent to 99.9-50% by mass acyclic saturated components among the saturated components. Both normal paraffins and isoparaffins are included by the term "acyclic saturated components". The proportions of normal paraffins and isoparaffins in the lubricating base oil of the invention are not particularly restricted so long as the urea adduct value satisfies the condition specified above, but the proportion of isoparaffins is preferably 50-99.9% by mass, more preferably 60-99.9% by mass, even more preferably 70-99.9% by mass and most preferably 80-99.9% by mass based on the total amount of the lubricating base oil. If the proportion of isoparaffins in the lubricating base oil satisfies the aforementioned conditions it will be possible to further improve the viscosity-temperature characteristic and heat and oxidation stability, while additives added to the lubricating base oil will be kept in a sufficiently stable dissolved state in the lubricating base oil and it will be possible for the functions of the additives to be exhibited at an even higher level.

The saturated component content for the purpose of the invention is the value measured according to ASTM D 2007-93 (units: % by mass).

The proportions of the cyclic saturated components and acyclic saturated components among the saturated components for the purpose of the invention are the naphthene portion (measured: monocyclic-hexacyclic naphthenes, units: % by mass) and alkane portion (units: % by mass), respectively, both measured according to ASTM D 2786-91.

The proportion of normal paraffins in the lubricating base oil for the purpose of the invention is the value obtained by analyzing saturated components separated and fractionated by the method of ASTM D 2007-93 by gas chromatography under the following conditions, and calculating the value obtained by identifying and quantifying the proportion of normal paraffins among those saturated components, with respect to the total amount of the lubricating base oil. For identification and quantitation, a C5-50 straight-chain normal paraffin mixture sample is used as the reference sample, and the normal paraffin content among the saturated components is determined as the proportion of the total of the peak areas corresponding to each normal paraffin, with respect to the total peak area of the chromatogram (subtracting the peak area for the diluent).

(Gas Chromatography Conditions)

Column: Liquid phase nonpolar column (length: 25 m), inner diameter: 0.3 mmφ, liquid phase film thickness: 0.1 μm), temperature elevating conditions: 50° C.-400° C. (temperature-elevating rate: 10° C./min).

Support gas: helium (linear speed: 40 cm/min)
Split ratio: 90/1
Sample injection rate: 0.5 μL (injection rate of sample diluted 20-fold with carbon disulfide).

The proportion of isoparaffins in the lubricating base oil is the value of the difference between the acyclic saturated components among the saturated components and the normal paraffins among the saturated components, based on the total amount of the lubricating base oil.

Other methods may be used for separation of the saturated components or for compositional analysis of the cyclic saturated components and acyclic saturated components, so long as they provide similar results. Examples of other methods include the method according to ASTM D 2425-93, the method according to ASTM D 2549-91, methods of high performance liquid chromatography (HPLC), and modified forms of these methods.

When the bottom fraction obtained from a fuel oil hydrocracker is used as the starting material for the lubricating base oil of this embodiment, the obtained base oil will have a saturated component content of 90% by mass or greater, a proportion of cyclic saturated components in the saturated components of 30-50% by mass, a proportion of acyclic saturated components in the saturated components of 50-70% by mass, a proportion of isoparaffins in the lubricating base oil of 40-70% by mass and a viscosity index of 100-135 and preferably 120-130, but if the urea adduct value satisfies the conditions specified above it will be possible to obtain a lubricating oil composition with the effect of the invention, i.e. an excellent low-temperature viscosity characteristic wherein the MRV viscosity at −40° C. is not greater than 20,000 mPa·s and especially not greater than 10,000 mPa·s. When a slack wax or Fischer-Tropsch wax having a high wax content (for example, a normal paraffin content of 50% by mass or greater) is used as the starting material for the lubricating base oil of the invention, the obtained base oil will have a saturated component content of 90% by mass or greater, a proportion of cyclic saturated components in the saturated components of 0.1-40% by mass, a proportion of acyclic saturated components in the saturated components of 60-99.9% by mass, a proportion of isoparaffins in the lubricating base oil of 60-99.9% by mass and a viscosity index of 100-170 and preferably 135-160, but if the urea adduct value satisfies the conditions specified above it will be possible to obtain a lubricating oil composition with very excellent properties in terms of the effect of the invention, and especially the high viscosity index and low-temperature viscosity characteristic, wherein the MRV viscosity at −40° C. is not greater than 12,000 mPa·s and especially not greater than 7000 mPa·s.

The aromatic content of the lubricating base oil of this embodiment is preferably not greater than 5% by mass, more preferably 0.05-3% by mass, even more preferably 0.1-1% by mass and most preferably 0.1-0.5% by mass based on the total amount of the lubricating base oil. If the aromatic content exceeds the aforementioned upper limit, the viscosity-temperature characteristic, heat and oxidation stability, frictional properties, low volatility and low-temperature viscosity characteristic will tend to be reduced, while the efficacy of additives when added to the lubricating base oil will also tend to be reduced. The lubricating base oil of the invention may be free of aromatic components, but the solubility of additives can be further increased with an aromatic content of 0.05% by mass or greater.

The aromatic component content, according to the invention, is the value measured according to ASTM D 2007-93. The aromatic portion normally includes alkylbenzenes and alkylnaphthalenes, as well as anthracene, phenanthrene and their alkylated forms, compounds with four or more fused benzene rings, and heteroatom-containing aromatic compounds such as pyridines, quinolines, phenols, naphthols and the like.

The % $C_P$ value of the lubricating base oil of this embodiment is preferably 80 or greater, more preferably 82-99, even more preferably 85-98 and most preferably 90-97. If the % $C_P$ value of the lubricating base oil is less than 80, the viscosity-temperature characteristic, heat and oxidation stability and frictional properties will tend to be reduced, while the efficacy of additives when added to the lubricating base oil will also tend to be reduced. If the % $C_P$ value of the lubricating base oil is greater than 99, on the other hand, the additive solubility will tend to be lower.

The % $C_N$ value of the lubricating base oil of this embodiment is preferably not greater than 20, more preferably not greater than 15, even more preferably 1-12 and most preferably 3-10. If the % $C_N$ value of the lubricating base oil exceeds 20, the viscosity-temperature characteristic, heat and oxidation stability and frictional properties will tend to be reduced. If the % $C_N$ is less than 1, however, the additive solubility will tend to be lower.

The % $C_A$ value of the lubricating base oil of this embodiment is preferably not greater than 0.7, more preferably not greater than 0.6 and even more preferably 0.1-0.5. If the % $C_A$ value of the lubricating base oil exceeds 0.7, the viscosity-temperature characteristic, heat and oxidation stability and frictional properties will tend to be reduced. The % $C_A$ value of the lubricating base oil of the invention may be zero, but the solubility of additives can be further increased with a % $C_A$ value of 0.1 or greater.

The ratio of the % $C_P$ and % $C_N$ values for the lubricating base oil of this embodiment is % $C_P$/% $C_N$ of preferably 7 or greater, more preferably 7.5 or greater and even more preferably 8 or greater. If the % $C_P$/% $C_N$ ratio is less than 7, the viscosity-temperature characteristic, heat and oxidation stability and frictional properties will tend to be reduced, while the efficacy of additives when added to the lubricating base oil will also tend to be reduced. The % $C_P$/% $C_N$ ratio is preferably not greater than 200, more preferably not greater than 100, even more preferably not greater than 50 and most preferably not greater than 25. The additive solubility can be further increased if the % $C_P$/% $C_N$ ratio is not greater than 200.

The % $C_P$, % $C_N$ and % $C_A$ values for the purpose of the invention are, respectively, the percentage of paraffinic carbons with respect to total carbon atoms, the percentage of naphthenic carbons with respect to total carbons and the percentage of aromatic carbons with respect to total carbons, as determined by the method of ASTM D 3238-85 (n-d-M ring analysis). That is, the preferred ranges for % $C_P$, % $C_N$ and % $C_A$ are based on values determined by these methods, and for example, % $C_N$ may be a value exceeding 0 according to these methods even if the lubricating base oil contains no naphthene portion.

The iodine value of the lubricating base oil of this embodiment is preferably not greater than 0.5, more preferably not greater than 0.3 and even more preferably not greater than 0.15, and although it may be less than 0.01, it is preferably 0.001 or greater and more preferably 0.05 or greater in consideration of economy and achieving a significant effect. Limiting the iodine value of the lubricating base oil to not greater than 0.5 can drastically improve the heat and oxidation stability. The "iodine value" for the purpose of the invention is the iodine value measured by the indicator titration method according to JIS K 0070, "Acid Values, Saponification Values, Iodine Values, Hydroxyl Values And Unsaponification Values Of Chemical Products".

The sulfur content in the lubricating base oil of this embodiment will depend on the sulfur content of the starting material. For example, when using a substantially sulfur-free starting material as for synthetic wax components obtained by Fischer-Tropsch reaction, it is possible to obtain a substantially sulfur-free lubricating base oil. When using a sulfur-containing starting material, such as slack wax obtained by a lubricating base oil refining process or microwax obtained by a wax refining process, the sulfur content of the obtained lubricating base oil can potentially be 100 ppm by mass or greater. From the viewpoint of further improving the heat and oxidation stability and reducing sulfur, the sulfur content in the lubricating base oil of the invention is preferably not greater than 10 ppm by mass, more preferably not greater than 5 ppm by mass and even more preferably not greater than 3 ppm by mass.

From the viewpoint of cost reduction it is preferred to use slack wax or the like as the starting material, in which case the sulfur content of the obtained lubricating base oil is preferably not greater than 50 ppm by mass and more preferably not greater than 10 ppm by mass. The sulfur content for the purpose of the invention is the sulfur content measured according to JIS K 2541-1996.

The nitrogen content in the lubricating base oil of this embodiment is not particularly restricted, but is preferably not greater than 5 ppm by mass, more preferably not greater than 3 ppm by mass and even more preferably not greater than 1 ppm by mass. If the nitrogen content exceeds 5 ppm by mass, the heat and oxidation stability will tend to be reduced. The nitrogen content for the purpose of the invention is the nitrogen content measured according to JIS K 2609-1990.

The lubricating base oil of this embodiment, satisfying conditions (i)-(v), can achieve high levels of both the viscosity-temperature characteristic and low-temperature viscosity characteristic compared to conventional lubricating base oils of the same viscosity grade, and in particular it has an excellent low-temperature viscosity characteristic whereby the viscous resistance or stirring resistance can be notably reduced.

The kinematic viscosity at 100° C. of the lubricating base oil (I) is preferably 1.5-20 mm$^2$/s and more preferably 2.0-11 mm$^2$/s. A kinematic viscosity at 100° C. of lower than 1.5 mm$^2$/s for the lubricating base oil (I) is not preferred from the standpoint of evaporation loss. If it is attempted to obtain a lubricating base oil having a kinematic viscosity at 100° C. of greater than 20 mm$^2$/s, the yield will be reduced and it will be difficult to increase the cracking severity even when using a heavy wax as the starting material.

The kinematic viscosity at 100° C. of the lubricating base oil (I) is preferably 3.5-4.5 mm$^2$/s and more preferably 3.7-4.1 mm$^2$/s. A kinematic viscosity at 100° C. of below this lower limit for the lubricating base oil is not preferred from the standpoint of evaporation loss. Also, if it is attempted to obtain a lubricating base oil having a kinematic viscosity at 100° C. above the upper limit, the yield will be reduced and it will be difficult to increase the cracking severity even when using a heavy wax as the starting material.

The 40° C. kinematic viscosity of the lubricating base oil (I) is preferably 14-18 mm$^2$/s and more preferably 15-17 mm$^2$/s.

The CCS viscosity at −35° C. for the lubricating base oil (I) is preferably not greater than 3000 mPa·s, more preferably not greater than 2000 mPa·s, even more preferably not greater than 1600 mPa·s and most preferably not greater than 1500 mPa·s. If the CCS viscosity at −35° C. exceeds the upper limit specified above, the low-temperature flow properties of lubricating oils employing the lubricating base oils will tend to be reduced. The CCS viscosity for the purpose of the invention is the viscosity measured according to JIS K 2010-1993.

The BF viscosity at −30° C. for the lubricating base oil (I) is preferably not greater than 30,000 mPa·s, more preferably not greater than 10,000 mPa·s, even more preferably not greater than 6000 mPa·s and most preferably not greater than 5000 mPa·s. If the BF viscosity at −40° C. exceeds the upper limit specified above, the low-temperature flow properties of lubricating oils employing the lubricating base oils will tend to be reduced. The BF viscosity is the viscosity measured according to JPI-5S-26-99.

Also, the kinematic viscosity at 100° C. of the lubricating base oil (II) is preferably 2.0-3.5 mm$^2$/s, more preferably 2.4-3.2 mm$^2$/s and most preferably 2.5-2.9 mm$^2$/s. A kinematic viscosity at 100° C. of below this lower limit for the lubricating base oil is not preferred from the standpoint of evaporation loss. Also, if it is attempted to obtain a lubricating base oil having a kinematic viscosity at 100° C. above the upper limit, the yield will be reduced and it will be difficult to increase the cracking severity even when using a heavy wax as the starting material.

The 40° C. kinematic viscosity of the lubricating base oil (II) is preferably 5-14 mm$^2$/s, more preferably 7-12 mm$^2$/s and most preferably 8.5-10.5 mm$^2$/s.

The BF viscosity at −30° C. for the lubricating base oil (III) is preferably not greater than 5000 mPa·s, more preferably not greater than 4000 mPa·s, even more preferably not greater than 3000 mPa·s and most preferably not greater than 2000 mPa·s. If the BF viscosity at −30° C. exceeds the upper limit specified above, the low-temperature flow properties of lubricating oils employing the lubricating base oils will tend to be reduced. The BF viscosity is the viscosity measured according to JPI-5S-26-99.

The density at 15° C. ($\rho_{15}$) (g/cm$^{-3}$) of the lubricating base oil of this embodiment is preferably not greater than the value of $\rho$ as represented by the following formula (1), i.e., $\rho_{15} \leq \rho$.

$$\rho = 0.0025 \times kv100 + 0.816 \quad (1)$$

[In this equation, kv100 represents the kinematic viscosity at 100° C. (mm$^2$/s) of the lubricating base oil.]

If $\rho_{15} > \rho$, the viscosity-temperature characteristic, heat and oxidation stability, low volatility and low-temperature viscosity characteristic of the lubricating base oil will tend to be reduced, while the efficacy of additives when added to the lubricating base oil will also tend to be reduced.

Also, the value of $\rho_{15}$ for the lubricating base oil (I) is preferably not greater than 0.830 and more preferably not greater than 0.820. The value of $\rho_{15}$ for the lubricating base oil (II) is preferably not greater than 0.820 and more preferably not greater than 0.810.

The density at 15° C. for the purpose of the invention is the density measured at 15° C. according to JIS K 2249-1995.

The aniline point (AP (° C.)) of the lubricating base oil of this embodiment is preferably greater than or equal to the value of A as represented by the following formula (2), i.e., AP≥A.

$$A = 4.3 \times kv100 + 100 \quad (2)$$

[In this equation, kv100 represents the kinematic viscosity at 100° C. (mm$^2$/s) of the lubricating base oil.]

If AP<A, the viscosity-temperature characteristic, heat and oxidation stability, low volatility and low-temperature viscosity characteristic of the lubricating base oil will tend to be reduced, while the efficacy of additives when added to the lubricating base oil will also tend to be reduced.

Also, the AP of the lubricating base oil (I) is preferably 110° C. or higher and more preferably 115° C. or higher, and preferably not higher than 130° C. and more preferably not higher than 125° C. The AP of the lubricating base oil (II) is preferably 100° C. or higher, more preferably 105° C. or higher and even more preferably 110° C. or higher, and preferably not higher than 125° C., more preferably not higher than 120° C. and even more preferably not higher than 115° C. The aniline point for the purpose of the invention is the aniline point measured according to JIS K 2256-1985.

The NOACK evaporation of the lubricating base oil of this embodiment is not particularly restricted, but it preferably satisfies the following conditions. Specifically, the NOACK evaporation for lubricating base oil (I) is preferably 5% by mass or greater, more preferably 8% by mass or greater and even more preferably 10% by mass or greater, and preferably not greater than 20% by mass, more preferably not greater than 17% by mass and even more preferably not greater than 15% by mass. The NOACK evaporation of the lubricating base oil (II) is preferably 20% by mass or greater, more preferably 25% by mass or greater and even more preferably 30 or greater, and preferably not greater than 60% by mass, more preferably not greater than 55% by mass and even more preferably not greater than 50% by mass. If the NOACK evaporation is below the aforementioned lower limit it will tend to be difficult to improve the low-temperature viscosity characteristic. If the NOACK evaporation is above the respective upper limit, the evaporation loss of the lubricating oil will be increased when the lubricating base oil is used as a lubricating oil for an internal combustion engine, and catalyst poisoning will be undesirably accelerated as a result. The NOACK evaporation for the purpose of the invention is the evaporation loss as measured according to ASTM D 5800-95.

As regards the distillation properties of the lubricating base oil of this embodiment, the initial boiling point (IBP) of the lubricating base oil (I) is preferably 340-410° C., more preferably 350-400° C. and even more preferably 360-390° C. The 10% distillation temperature (T10) is preferably 365-435° C., more preferably 375-425° C. and even more preferably 385-415° C. The 50% running point (T50) is preferably 400-465° C., more preferably 410-455° C. and even more preferably 420-445° C. The 90% running point (T90) is preferably 425-485° C., more preferably 435-475° C. and even more preferably 445-465° C. The final boiling point (FBP) is preferably 455-515° C., more preferably 465-505° C. and even more preferably 475-495° C. T90-T10 is preferably 40-75° C., more preferably 45-70° C. and even more preferably 50-60° C. FBP-IBP is preferably 80-125° C., more preferably 85-120° C. and even more preferably 90-110° C. T10-IBP is preferably 10-55° C., more preferably 15-33° C. and even more preferably 20-30° C. FBP-T90 is preferably 10-65° C., more preferably 15-55° C. and even more preferably 20-45° C.

The initial boiling point (IBP) of the lubricating base oil (II) is preferably 280-350° C., more preferably 290-340° C. and even more preferably 300-330° C. The 10% distillation temperature (T10) is preferably 320-390° C., more preferably 330-380° C. and even more preferably 340-370° C. The 50% running point (T50) is preferably 355-425° C., more preferably 365-415° C. and even more preferably 375-405° C. The 90% running point (T90) is preferably 375-445° C., more preferably 385-435° C. and even more preferably 395-425° C. The final boiling point (FBP) is preferably 395-465° C., more preferably 405-455° C. and even more preferably 415-445° C. T90-T10 is preferably 40-90° C., more preferably 45-80° C. and even more preferably 50-70° C. FBP-IBP is preferably 80-155° C., more preferably 90-135° C., even more preferably 100-120° C. and most preferably 105-115° C. T10-IBP is preferably 25-80° C., more preferably 30-60° C. and even more preferably 35-45° C. FBP-T90 is preferably 5-60° C., more preferably 10-45° C. and even more preferably 10-20° C.

By setting IBP, T10, T50, T90, FBP, T90-T10, FBP-IBP, T10-IBP and FBP-T90 within the preferred ranges specified above for the lubricating base oils (I) and (II), it is possible to further improve the low-temperature viscosity and further reduce the evaporation loss. If the distillation ranges for T90-T10, FBP-IBP, T10-IBP and FBP-T90 are too narrow, the lubricating base oil yield will be poor resulting in low economy.

The IBP, T10, T50, T90 and FBP values for the purpose of the invention are the running points measured according to ASTM D 2887-97.

Also, the RBOT life for the lubricating base oil (I) is preferably 350 min or greater, more preferably 400 min or greater and even more preferably 440 min or greater. The RBOT life for the lubricating base oil (II) is preferably 350 min or greater, more preferably 370 min or greater and even more preferably 390 min or greater. If the RBOT life of the lubricating base oil is less than the specified lower limit, the viscosity-temperature characteristic and heat and oxidation stability of the lubricating base oil will tend to be reduced, while the efficacy of additives when added to the lubricating base oil will also tend to be reduced.

The RBOT life for the purpose of the invention is the RBOT value as measured according to JIS K 2514-1996, for a composition obtained by adding a phenol-based antioxidant (2,6-di-tert-butyl-p-cresol: DBPC) at 0.6% by mass to the lubricating base oil.

The lubricating base oil of this embodiment exhibits an excellent viscosity-temperature characteristic and low-temperature viscosity characteristic, while also having low viscous resistance and stirring resistance and improved heat and oxidation stability and frictional properties, making it possible to achieve an increased friction reducing effect and thus improved energy savings. When additives are included in the lubricating base oil of this embodiment, the functions of the additives (improved low-temperature viscosity characteristic with pour point depressants, improved heat and oxidation stability by antioxidants, increased friction reducing effect by friction modifiers, improved antiwear property by anti-wear agents, etc.) are exhibited at a higher level. The lubricating base oil of this embodiment can therefore be applied as a base oil for a variety of lubricating oils. The specific use of the lubricating base oil of this embodiment may be as a lubricating oil for an internal combustion engine such as a passenger vehicle gasoline engine, two-wheel vehicle gasoline engine, diesel engine, gas engine, gas heat pump engine, marine engine, electric power engine or the like (internal combustion engine lubricating oil), as a lubricating oil for a drive transmission such as an automatic transmission, manual transmission, non-stage transmission, final reduction gear or the like (drive transmission oil), as a hydraulic oil for a hydraulic power unit such as a damper, construction machine or the like, or as a compressor oil, turbine oil, industrial gear oil, refrigerator oil, rust preventing oil, heating medium oil, gas holder seal oil, bearing oil, paper machine oil, machine tool oil, sliding guide surface oil, electrical insulating oil, machining oil, press oil, rolling oil, heat treatment oil or the like, and using the lubricating base oil of the invention for these purposes will allow the improved characteristics of the lubricating oil including the viscosity-temperature characteristic, heat and oxidation stability, energy savings and fuel efficiency to be exhibited at a high level, together with a longer lubricating oil life and lower levels of environmentally unfriendly substances.

Second Embodiment

Lubricating Oil Composition

The lubricating oil composition of this embodiment comprises a lubricating oil composition according to the first embodiment described above. The lubricating oil composition of this embodiment may be used alone as a lubricating base oil according to the first embodiment, or the lubricating base oil of the first embodiment may be combined with one or more other base oils. When the lubricating base oil of the first embodiment is combined with another base oil, the proportion of the lubricating base oil of the first embodiment of the total mixed base oil is preferably at least 30% by mass, more preferably at least 50% by mass and even more preferably at least 70% by mass.

There are no particular restrictions on the other base oil used in combination with the lubricating base oil of the first embodiment, and as examples of mineral base oils there may be mentioned solvent refined mineral oils, hydrocracked mineral oils, hydrorefined mineral oils and solvent dewaxed base oils having kinematic viscosities at 100° C. of 1-100 mm$^2$/s.

As synthetic base oils there may be mentioned poly-α-olefins and their hydrogenated forms, isobutene oligomers and their hydrogenated forms, isoparaffins, alkylbenzenes, alkylnaphthalenes, diesters (ditridecyl glutarate, di-2-ethylhexyl adipate, diisodecyl adipate, ditridecyl adipate, di-2-ethylhexyl sebacate and the like), polyol esters (trimethylolpropane caprylate, trimethylolpropane pelargonate, pentaerythritol 2-ethylhexanoate, pentaerythritol pelargonate and the like), polyoxyalkylene glycols, dialkyldiphenyl ethers and polyphenyl ethers, among which poly-α-olefins are preferred. Typical poly-α-olefins include C2-32 and preferably C6-16 α-olefin oligomers or co-oligomers (1-octene oligomer, decene oligomer, ethylene-propylene co-oligomers and the like), and their hydrides.

There are no particular restrictions on the method for producing poly-α-olefins, and as an example there may be mentioned a process wherein an α-olefin is polymerized in the presence of a polymerization catalyst such as a Friedel-Crafts catalyst comprising a complex of aluminum trichloride or boron trifluoride with water, an alcohol (ethanol, propanol, butanol or the like) and a carboxylic acid or ester.

The lubricating oil composition of this embodiment may also contain various additives if necessary. Such additives are not particularly restricted, and any additives that are commonly employed in the field of lubricating oils may be used. Specific lubricating oil additives include antioxidants, ashless dispersants, metal-based detergent s, extreme-pressure agents, anti-wear agents, viscosity index improvers, pour point depressants, friction modifiers, oiliness agents, corrosion inhibitors, rust-preventive agents, demulsifiers, metal deactivating agents, seal swelling agents, antifoaming agents, coloring agents, and the like. These additives may be used alone or in combinations of two or more. Especially when the lubricating oil composition of the invention contains a pour point depressant, it is possible to achieve an excellent low-temperature viscosity characteristic (a MRV viscosity at −40° C. of preferably not greater than 20,000 mPa·s, more preferably not greater than 15,000 mPa·s and even more preferably not greater than 10,000 mPa·s) since the effect of adding the pour point depressant is maximized by the lubricating base oil of the invention. The MRV viscosity at −40° C. is the MRV viscosity at −40° C. measured according to JPI-5 S-42-93. When a pour point depressant is added to base oils (II) and (V), for example, it is possible to obtain a lubricating oil composition having a highly excellent low-temperature viscosity characteristic wherein the MRV viscosity at −40° C. is greater than 12,000 mPa·s, more preferably not greater than 10,000 mPa·s, even more preferably 8000 mPa·s and most preferably not greater than 6500 mPa·s. In this case, the content of the pour point depressant is 0.05-2% by mass and preferably 0.1-1.5% by mass based on the total amount of the composition, with a range of 0.15-0.8% by mass being optimal for lowering the MRV viscosity, while the weight-average molecular weight of the pour point depressant is preferably 10,000-300,000 and more preferably 50,000-200,000, and the pour point depressant is preferably a polymethacrylate-based compound.

A preferred mode of the lubricating oil composition of this embodiment is a lubricating oil composition further comprising a lubricating base oil of the first embodiment and a viscosity index improver, and having a kinematic viscosity at 100° C. of 4-12 mm$^2$/s and a viscosity index of 140-300 (lubricating oil composition (III)). The lubricating oil composition (III) will now be explained in detail.

The lubricating base oil used as the lubricating base oil in the lubricating oil composition (III) is preferably a lubricating base oil according to the first embodiment, having a urea adduct value of not greater than 4% by mass, a kinematic viscosity at 40° C. of not greater than 25 mm$^2$/s, a viscosity index of 120 or higher and a T90-T5 of not higher than 75° C. (hereinafter referred to as "lubricating base oil (III)" for convenience). In this case, so long as it has a urea adduct value, kinematic viscosity at 40° C., viscosity index and T90-T5 satisfying the aforementioned conditions, it may be a mineral base oil, a synthetic base oil, or even a mixture thereof.

The lubricating base oil (III) is preferably a mineral base oil or synthetic base oil, or a mixture thereof, obtained by hydrocracking/hydroisomerization of a feed stock oil containing normal paraffins, to a urea adduct value of not greater than 4% by mass, a kinematic viscosity at 40° C. of not greater than 25 mm$^2$/s, a viscosity index of 120 or higher and a T90-T5 of not higher than 75° C., since this will allow all of the requirements for the viscosity-temperature characteristic, low-temperature viscosity characteristic and thermal conductivity to be achieved at a high levels.

From the viewpoint of improving the low-temperature viscosity characteristic without impairing the viscosity-temperature characteristic, and obtaining high thermal conductivity, the urea adduct value of the lubricating base oil (III) must be not greater than 4% by mass as mentioned above, but it is preferably not greater than 3.5% by mass, more preferably not greater than 3% by mass, even more preferably not greater than 2.5% by mass, yet more preferably not greater than 2.0% by mass and most preferably not greater than 1.5% by mass. The urea adduct value of the lubricating base oil (III) may even be 0% by mass, but from the viewpoint of obtaining a lubricating base oil with a sufficient low-temperature viscosity characteristic and high viscosity index, and also of relaxing the dewaxing conditions and improving economy, it is preferably 0.1% by mass or greater, more preferably 0.5% by mass or greater and most preferably 0.8% by mass or greater.

The kinematic viscosity at 40° C. of the lubricating base oil (III) must be not greater than 25 mm$^2$/s, and it is preferably not greater than 18 mm$^2$/s, more preferably not greater than 16 mm$^2$/s, even more preferably not greater than 15 mm$^2$/s, particularly preferably not greater than 14 mm$^2$/s and most preferably not greater than 13 mm$^2$/s. On the other hand, the kinematic viscosity at 40° C. is preferably 5 mm²/s or greater, more preferably 8 mm²/s or greater, even more preferably 9 or greater and most preferably 10 or greater. The kinematic viscosity at 40° C. is the kinematic viscosity at 40° C. measured according to ASTM D-445. If the kinematic viscosity at 40° C. of the lubricating base oil (III) exceeds 25 mm²/s, the low-temperature viscosity characteristic may be impaired and sufficient fuel efficiency may not be obtained, while if it is less than 5 mm²/s, oil film formation at the lubricated sections will be inadequate, resulting in inferior lubricity and potentially large evaporation loss of the lubricating oil composition.

The viscosity index of the lubricating base oil (III) must be a value of 120 or higher in order to obtain an excellent viscosity characteristic from low temperature to high temperature, and for resistance to evaporation even with low viscosity, but it is preferably 125 or higher, more preferably 130 or higher, even more preferably 135 or higher and most preferably 140 or higher. There are no particular restrictions on the upper limit for the viscosity index, and it may be about 125-180 such as for normal paraffins, slack waxes or GTL waxes, or their isomerized isoparaffinic mineral oils, or about 150-250 such as for complex esteric base oils or HVI-PAO base oils. However, for normal paraffins, slack waxes or GTL waxes, or their isomerized isoparaffinic mineral oils, it is preferably not higher than 180, more preferably not higher than 160, even more preferably not higher than 150 and especially not higher than 145, for an improved low-temperature viscosity characteristic.

As regards the distillation properties of the lubricating base oil (III), the value of T90-T5, as the difference between the 90% distillation temperature and the 5% distillation temperature, must be not more than 75° C., and it is preferably not higher than 70° C., more preferably not higher than 68° C., even more preferably not higher than 67° C. and most preferably not higher than 66° C. T90-T5 is also preferably at least 30° C., more preferably at least 40° C. and most preferably at least 50° C. A T90-T5 value exceeding 75° C. will lead to significant evaporation loss of the lubricating oil, while suppressing evaporation loss may result in inferior fuel efficiency, and this is therefore undesirable. A T90-T5 value of less than 30° C. will result in a lower yield for the effect, potentially leading to large increase in production cost, and this is therefore undesirable.

A feed stock oil containing normal paraffins may be used for production of the lubricating base oil component of the invention. The feed stock oil may be a mineral oil or a synthetic oil, or a mixture of two or more thereof. The normal paraffin content of the feed stock oil is preferably 50% by mass or greater, more preferably 70% by mass or greater, even more preferably 80% by mass or greater, yet more preferably 90% by mass, even yet more preferably 95% by mass or greater and most preferably 97% by mass or greater, based on the total amount of the feed stock oil. Specific examples for the feed stock oil include the same feed stock oils mentioned for the first embodiment, and their explanation will not be repeated here.

The lubricating base oil component of the invention may be obtained through a step of hydrocracking/hydroisomerization of the feed stock oil until the obtained treated product has a urea adduct value, a kinematic viscosity at 40° C., a viscosity index and a T90-T5 satisfying the conditions specified above. This hydrocracking/hydroisomerization step is the same as the hydrocracking/hydroisomerization step for the first embodiment, except for differences in the conditions to be satisfied by the desired lubricating base oil.

The urea adduct value, kinematic viscosity at 40° C., viscosity index and T90-T5 of the lubricating base oil (III) preferably further satisfy the following conditions, in addition to the respective conditions specified above.

The kinematic viscosity at 100° C. of the lubricating base oil (III) is preferably not greater than 4.5 mm²/s, more preferably not greater than 4.0 mm²/s, even more preferably not greater than 3.8 mm²/s, yet more preferably not greater than 3.6 mm²/s, even yet more preferably not greater than 3.5 mm²/s and most preferably not greater than 3.4 mm²/s. On the other hand, the kinematic viscosity at 100° C. is also preferably 2.0 mm²/s or greater, more preferably 2.5 mm²/s or greater, even more preferably 2.8 mm²/s or greater, yet more preferably 3.0 mm²/s or greater and most preferably 3.1 mm²/s or greater. The 100° C. kinematic viscosity is the kinematic viscosity at 100° C. measured according to ASTM D-445. If the kinematic viscosity at 100° C. of the lubricating base oil (III) exceeds 4.5 mm²/s, the low-temperature viscosity characteristic may be impaired and sufficient fuel efficiency may not be obtained, while if it is 2.0 mm²/s or lower, oil film formation at the lubricated sections will be inadequate, resulting in inferior lubricity and potentially large evaporation loss of the lubricating oil composition.

The pour point of the lubricating base oil (III) will depend on the viscosity grade of the lubricating base oil, but it is preferably not higher than −10° C., more preferably not higher than −12.5° C., even more preferably not higher than −15° C., most preferably not higher than −17.5° C., and especially preferably not higher than −20° C. If the pour point exceeds the upper limit specified above, the low-temperature flow properties of the lubricating oil employing the lubricating base oil may be reduced. The pour point of the lubricating base oil (III) is also preferably −50° C. or higher, more preferably −40° C. or higher, even more preferably −30° C. or higher and most preferably −25° C. or higher. If the pour point is below this lower limit, the viscosity index of the entire lubricating oil employing the lubricating base oil component will be reduced, potentially impairing the fuel efficiency. The pour point for the purpose of the invention is the pour point measured according to JIS K 2269-1987.

The iodine value of the lubricating base oil (III) is preferably not greater than 1, more preferably not greater than 0.5, even more preferably not greater than 0.3, yet more preferably not greater than 0.15 and most preferably not greater than 0.1. Although the value may be less than 0.01, in consideration of the fact that this does not produce any further significant corresponding effect and is uneconomical, the value is preferably 0.001 or greater, more preferably 0.01 or greater, even more preferably 0.03 or greater and most preferably 0.05 or greater. Limiting the iodine value of the lubricating base oil (III) to not greater than 0.5 can drastically improve the heat and oxidation stability.

The sulfur content of the lubricating base oil (III) is not particularly restricted but is preferably not greater than 50 ppm by mass, more preferably not greater than 10 ppm by mass, even more preferably not greater than 5 ppm by mass and most preferably not greater than 1 ppm by mass. A sulfur content of not greater than 50 ppm by mass will allow excellent heat and oxidation stability to be achieved.

The NOACK evaporation, as the evaporation loss of the lubricating base oil (III), is preferably not greater than 30% by mass, more preferably not greater than 27, even more preferably not greater than 25% by mass and most preferably not greater than 23% by mass. If the NOACK evaporation of the lubricating base oil (III) exceeds 30% by mass, the evaporation loss of the lubricating oil will increase, resulting in increased viscosity and the like, and this is therefore undesirable.

For the distillation properties of the lubricating base oil (III), the initial boiling point (IBP) is preferably 320-390° C., more preferably 330-380° C. and even more preferably 340-370° C. The 5% distillation temperature (T5) is preferably 340-405° C., more preferably 350-400° C. and even more preferably 360-390° C. The 10% distillation temperature (T10) is preferably 370-410° C., more preferably 375-400° C. and even more preferably 380-390° C. The 50% running point (T50) is preferably 390-440° C., more preferably 400-430° C. and even more preferably 405-420° C. The 90% running point (T90) is preferably 410-460° C., more preferably 420-450° C. and even more preferably 425-445° C. The final boiling point (FBP) is preferably 430-490° C., more preferably 440-480° C. and even more preferably 445-470° C.

T90-T10 is preferably 40-70° C., more preferably 45-65° C. and even more preferably 50-60° C. FBP-IBP is preferably 70-150° C., more preferably 80-130° C. and even more preferably 90-120° C. T10-IBP is preferably 15-70° C., more preferably 20-50° C. and even more preferably 25-40° C. FBP-T90 is preferably 10-50° C., more preferably 15-40° C. and even more preferably 15-30° C.

By setting IBP, T10, T50, T90, FBP, T90-T10, FBP-IBP, T10-IBP and FBP-T90 of the lubricating base oil (III) to within the preferred ranges specified above, it is possible to further improve the low-temperature viscosity and further reduce the evaporation loss. If the distillation ranges for T90-T10, FBP-IBP, T10-IBP and FBP-T90 are too narrow, the lubricating base oil yield will be poor resulting in low economy.

The lubricating base oil (III) has a ratio of the kinematic viscosity at 100° C. (kv100) to T10 (kv100/T10, units: $mm^2s^{-1}$/° C.) of preferably 0.007-0.015 and more preferably 0.008-0.009. The lubricating base oil component of the invention has a ratio of the kinematic viscosity at 100° C. (kv100) to T20 (kv100/T20, units: $mm^2s^{-1}$/° C.) of preferably 0.007-0.010 and more preferably 0.008-0.009. The lubricating base oil component of the invention also has a ratio of the kinematic viscosity at 100° C. (kv100) to T50 (kv100/T50, units: $mm^2s^{-1}$/° C.) of preferably 0.006-0.009 and more preferably 0.007-0.008. If kv100/T10, kv100/T20 or kv100/T50 is below the respective lower limit the lubricating base oil yield will tend to be reduced, while it is also undesirable in terms of economy, and if it exceeds the aforementioned upper limits the evaporation properties of the lubricating oil composition will tend to increase relative to the obtained viscosity index.

The preferred ranges for % $C_P$, % $C_N$, % $C_A$ and the ratio of % $C_P$ and % $C_N$ for the lubricating base oil (III) are the same as the % $C_P$, % $C_N$, % $C_A$ and ratio of % $C_P$ and % $C_N$ for the lubricating base oil (II) of the first embodiment, and their explanation will not be repeated here.

For the lubricating oil composition (III), the lubricating base oil (III) may be a single lubricating base oil having a urea adduct value of not greater than 4% by mass, a kinematic viscosity at 40° C. of not greater than 25 $mm^2$/s, a viscosity index or 120 or higher and a T90-T5 of not more than 75° C., or it may be a combination of two or more different ones.

The lubricating base oil in the lubricating oil composition (III) may consist entirely of the lubricating base oil (III), or it may further comprise a lubricating base oil component other than the lubricating base oil (III). When the lubricating oil composition (III) further comprises a lubricating base oil component other than the lubricating base oil (III), the content ratio of the lubricating base oil (III) is 10-100% by mass, preferably 30-98% by mass, more preferably 50-95% by mass, even more preferably 70-93% by mass and most preferably 80-95% by mass, based on the total amount of the lubricating base oil in the lubricating oil composition (III). If the content ratio is less than 10% by mass, it may not be possible to obtain the necessary low-temperature viscosity and fuel efficiency performance.

Specific examples of lubricating base oil components other than the lubricating base oil (III) are the same as the specific examples of other base oils to be used with the lubricating base oil of the first embodiment, mentioned in the explanation of the first embodiment, and they will not be mentioned again here. Preferred examples of mineral base oils include solvent refined mineral oils, hydrocracked mineral oils, hydrorefined mineral oils and solvent dewaxed base oils having kinematic viscosities at 100° C. of 1-100 $mm^2$/s.

When the lubricating base oil (III) is used together with another lubricating base oil component, the proportion of the other lubricating base oil component is preferably not more than 90% by mass based on the total amount of the lubricating base oils in the lubricating oil composition (III).

The viscosity index improver in the lubricating oil composition (III) will now be described. The viscosity index improver is not particularly restricted, and a known viscosity index improver may be used such as a poly(meth)acrylate-based viscosity index improver, an olefin copolymer-based viscosity index improver or a styrene-diene copolymer-based viscosity index improver, which may be non-dispersed or dispersed types, with non-dispersed types being preferred. Poly(meth)acrylate-based viscosity index improvers are preferred and non-dispersed poly(meth)acrylate-based viscosity index improvers are more preferred among these, to more easily obtain a lubricating oil composition having a high viscosity index-improving effect, and an excellent viscosity-temperature characteristic and low-temperature viscosity characteristic.

The PSSI (Permanent Shear Stability Index) of the poly(meth)acrylate-based viscosity index improver is preferably not greater than 40, more preferably 5-40, even more preferably 10-35, yet more preferably 15-30 and most preferably 20-25. If the PSSI exceeds 40, the shear stability may be impaired. If the PSSI is less than 5, not only will the viscosity index-improving effect be low and the fuel efficiency and low-temperature viscosity characteristic inferior, but cost may also increase.

The weight-average molecular weight ($M_W$) of the poly(meth)acrylate-based viscosity index improver is preferably 5,000 or greater, more preferably 50,000 or greater, even more preferably 100,000 or greater, yet more preferably 200,000 or greater and most preferably 300,000 or greater. It is also preferably not greater than 1,000,000, more preferably not greater than 700,000, even more preferably not greater than 600,000 and most preferably not greater than 500,000. If the weight-average molecular weight is less than 5,000, the effect of improving the viscosity index will be minimal, not only resulting in inferior fuel efficiency and low-temperature viscosity characteristics but also potentially increasing cost, while if the weight-average molecular weight is greater than 1,000,000 the shear stability, solubility in the base oil and storage stability may be impaired.

The ratio of the weight-average molecular weight and number-average molecular weight of the poly(meth)acrylate-based viscosity index improver ($M_W/M_n$) is preferably 0.5-5.0, more preferably 1.0-3.5, even more preferably 1.5-3 and most preferably 1.7-2.5. If the ratio of the weight-average molecular weight and number-average molecular weight is less than 0.5 or greater than 5.0, not only will the solubility in the base oil and the storage stability be impaired, but potentially the viscosity-temperature characteristic will be reduced and the fuel efficiency lowered.

The weight-average molecular weight and number-average molecular weight referred to here are the weight-average molecular weight and number-average molecular weight based on polystyrene, as measured using a 150-C ALC/GPC by Japan Waters Co., equipped with two GMHHR-M (7.8 mmID×30 cm) columns by Tosoh Corp. in series, with tetrahydrofuran as the solvent, a temperature of 23° C., a flow rate of 1 mL/min, a sample concentration of 1% by mass, a sample injection rate of 75 μL and a differential refractometer (RI) as the detector.

The ratio of the weight-average molecular weight and the PSSI of the poly(meth)acrylate-based viscosity index improver ($M_w$/PSSI) is not particularly restricted, but it is preferably $1\times10^4$ or greater, more preferably $1.2\times10^4$ or greater, even more preferably $1.4\times10^4$ or greater, yet more preferably $1.5\times10^4$ or greater, even yet more preferably $1.7\times10^4$ or greater and most preferably $1.9\times10^4$ or greater, and preferably not greater than $4\times10^4$. By using a viscosity index improver with an $M_w$/PSSI ratio of $1\times10^4$ or greater, it is possible to obtain a composition with an excellent low-temperature viscosity characteristic, and a further reduced HTHS viscosity at 100° C., and therefore especially superior fuel efficiency.

The structure of the poly(meth)acrylate-based viscosity index improver is not particularly restricted so long as it is one as described above, and a poly(meth)acrylate-based viscosity index improver obtained by polymerization of one or more monomers selected from among those represented by formulas (1)-(4) below may be used.

More preferred among these poly(meth)acrylate-based viscosity index improvers are those comprising 0.5-70% by mole of one or more (meth)acrylate structural units represented by the following formula (1).

[Chemical Formula 2]

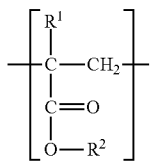

(1)

[In formula (1), $R^1$ represents hydrogen or a methyl group and $R^2$ represents a C16 or greater straight-chain or branched hydrocarbon group.]

$R^2$ in the structural unit represented by formula (1) is a C16 or greater straight-chain or branched hydrocarbon group, as mentioned above, and is preferably a C18 or greater straight-chain or branched hydrocarbon, more preferably a C20 or greater straight-chain or branched hydrocarbon and even more preferably a C20 or greater branched hydrocarbon group. There is no particular upper limit on the hydrocarbon group represented by $R^2$, but it is preferably not greater than a C500 straight-chain or branched hydrocarbon group. It is more preferably a C50 or lower straight-chain or branched hydrocarbon, even more preferably a C30 or lower straight-chain or branched hydrocarbon, yet more preferably a C30 or lower branched hydrocarbon and most preferably a C25 or lower branched hydrocarbon.

The proportion of (meth)acrylate structural units represented by formula (1) in the polymer for the poly(meth)acrylate-based viscosity index improver is 0.5-70% by mole as mentioned above, but it is preferably not greater than 60% by mole, more preferably not greater than 50% by mole, even more preferably not greater than 40% by mole and most preferably not greater than 30% by mole. It is also preferably 1% by mole or greater, more preferably 3% by mole or greater, even more preferably 5% by mole or greater and most preferably 10% by mole or greater. At greater than 70% by mole the viscosity-temperature characteristic-improving effect and the low-temperature viscosity characteristic may be impaired, and at below 0.5% by mole the viscosity-temperature characteristic-improving effect may be impaired.

The poly(meth)acrylate-based viscosity index improver may be obtained by copolymerization of any (meth)acrylate structural unit, or any olefin or the like, in addition to a (meth)acrylate structural unit represented by formula (1).

Any monomer may be combined with the (meth)acrylate structural unit represented by formula (1), but such a monomer is preferably one represented by the following formula (2) (hereunder, "monomer (M-1)"). The copolymer with monomer (M-1) is a non-dispersed poly(meth)acrylate-based viscosity index improver.

[Chemical Formula 3]

(2)

[In formula (2), $R^3$ represents hydrogen or methyl and $R^4$ represents a C1-15 straight-chain or branched hydrocarbon group.]

As other monomers to be combined with the (meth)acrylate structural unit represented by formula (1) there are preferred one or more selected from among monomers represented by the following formula (3) (hereunder, "monomer (M-2)") and monomers represented by the following formula (4) (hereunder, "monomer (M-3)"). The copolymer with monomer (M-3) and/or (M-4) is a dispersed poly(meth)acrylate-based viscosity index improver. The dispersed poly(meth)acrylate-based viscosity index improver may further comprise monomer (M-1) as a constituent monomer.

[Chemical Formula 4]

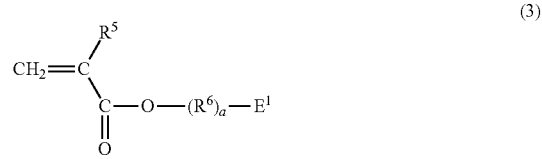

(3)

[In general formula (3), $R^5$ represents hydrogen or methyl, $R^6$ represents a C1-18 alkylene group, $E^1$ represents an amine residue or heterocyclic residue containing 1-2 nitrogen atoms and 0-2 oxygen atoms, and a is 0 or 1.]

Specific examples of C1-18 alkylene groups represented by $R^6$ include ethylene, propylene, butylene, pentylene, hexylene, heptylene, octylene, nonylene, decylene, undecylene, dodecylene, tridecylene, tetradecylene, pentadecylene, hexadecylene, heptadecylene and octadecylene (which alkylene groups may be straight-chain or branched).

Specific examples of groups represented by $E^1$ include dimethylamino, diethylamino, dipropylamino, dibutylamino, anilino, toluidino, xylidino, acetylamino, benzoylamino, morpholino, pyrrolyl, pyrrolino, pyridyl, methylpyridyl, pyrrolidinyl, piperidinyl, quinonyl, pyrrolidonyl, pyrrolidono, imidazolino and pyrazino.

[Chemical Formula 5]

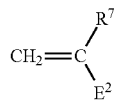

(4)

[In general formula (4), $R^7$ represents hydrogen or methyl and $E^2$ represents an amine residue or heterocyclic residue containing 1-2 nitrogen atoms and 0-2 oxygen atoms.]

Specific examples of groups represented by $E^2$ include dimethylamino, diethylamino, dipropylamino, dibutylamino, anilino, toluidino, xylidino, acetylamino, benzoylamino, morpholino, pyrrolyl, pyrrolino, pyridyl, methylpyridyl, pyrrolidinyl, piperidinyl, quinonyl, pyrrolidonyl, pyrrolidono, imidazolino and pyrazino.

Specific preferred examples for monomers (M-2) and (M-3) include dimethylaminomethyl methacrylate, diethylaminomethyl methacrylate, dimethylaminoethyl methacrylate, diethylaminoethyl methacrylate, 2-methyl-5-vinylpyridine, morpholinomethyl methacrylate, morpholinoethyl methacrylate, N-vinylpyrrolidone, and mixtures of the foregoing.

The copolymerization molar ratio of the copolymer of the (meth)acrylate structural unit represented by formula (1) and monomer (M-1)-(M-3) is not particularly restricted, but it is preferably such that the (meth)acrylate structural unit represented by formula (1): monomer (M-1)-(M-3)=0.5:99.5-70:30, more preferably 5:90-50:50 and even more preferably 20:80-40:60.

Any production process may be employed for the poly(meth)acrylate-based viscosity index improver, and for example, it can be easily obtained by radical solution polymerization of a (meth)acrylate structural unit represented by formula (1) and monomers (M-1)-(M-3) in the presence of a polymerization initiator such as benzoyl peroxide.

The viscosity index improver content of the lubricating oil composition (III) is preferably 0.1-50% by mass, more preferably 0.5-40% by mass, even more preferably 1-30% by mass and most preferably 5-20% by mass, based on the total amount of the composition. If the viscosity index improver content is less than 0.1% by mass, the viscosity index improving effect or product viscosity reducing effect will be minimal, potentially preventing improvement in fuel efficiency. A content of greater than 50% by mass will drastically increase production cost while requiring reduced base oil viscosity, and can thus risk lowering the lubricating performance under harsh lubrication conditions (high-temperature, high-shear conditions), as well as causing problems such asabrasion wear, seizing and fatigue fracture.

The lubricating oil composition (III) may further contain, in addition to the viscosity index improver, also common non-dispersed or dispersed poly(meth)acrylates, non-dispersed or dispersed ethylene-α-olefin copolymers or their hydrides, polyisobutylene or its hydride, styrene-diene hydrogenated copolymers, styrene-maleic anhydride ester copolymers and polyalkylstyrenes.

The lubricating oil composition (III) may also further contain any additives commonly used in lubricating oils, for the purpose of enhancing performance. Examples of such additives include additives such as friction modifiers, metal-based detergents, ashless dispersants, antioxidants, anti-wear agents (or extreme-pressure agents), corrosion inhibitors, rust-preventive agents, pour point depressants, demulsifiers, metal deactivating agents and antifoaming agents.

For example, the lubricating oil composition (III) may also contain at least one friction modifier selected from among organic molybdenum compounds and ashless friction modifiers, in order to increase the fuel efficiency performance.

Organic molybdenum compounds include sulfur-containing organic molybdenum compounds such as molybdenum dithiophosphates and molybdenum dithiocarbamates.

Examples of preferred molybdenum dithiocarbamates include, specifically, molybdenum sulfide diethyl dithiocarbamate, molybdenum sulfide dipropyl dithiocarbamate, molybdenum sulfide dibutyl dithiocarbamate, molybdenum sulfide dipentyl dithiocarbamate, molybdenum sulfide dihexyl dithiocarbamate, molybdenum sulfide dioctyl dithiocarbamate, molybdenum sulfide didecyl dithiocarbamate, molybdenum sulfide didodecyl dithiocarbamate, molybdenum sulfide di(butylphenyl)dithiocarbamate, molybdenum sulfide di(nonylphenyl)dithiocarbamate, oxymolybdenum sulfide diethyl dithiocarbamate, oxymolybdenum sulfide dipropyl dithiocarbamate, oxymolybdenum sulfide dibutyl dithiocarbamate, oxymolybdenum sulfide dipentyl dithiocarbamate, oxymolybdenum sulfide dihexyl dithiocarbamate, oxymolybdenum sulfide dioctyl dithiocarbamate, oxymolybdenum sulfide didecyl dithiocarbamate, oxymolybdenum sulfide didodecyl dithiocarbamate, oxymolybdenum sulfide di(butylphenyl)dithiocarbamate and oxymolybdenum sulfide di(nonylphenyl)dithiocarbamate (where the alkyl groups may be linear or branched, and the alkyl groups may be bonded at any position of the alkylphenyl groups), as well as mixtures of the foregoing. Also preferred as molybdenum dithiocarbamates are compounds with different numbers of carbon atoms and/or structural hydrocarbon groups in the molecule.

Other sulfur-containing organic molybdenum compounds include complexes of molybdenum compounds (for example, molybdenum oxides such as molybdenum dioxide and molybdenum trioxide, molybdic acids such as orthomolybdic acid, paramolybdic acid and (poly)molybdic sulfide acid, molybdic acid salts such as metal salts or ammonium salts of these molybdic acids, molybdenum sulfides such as molybdenum disulfide, molybdenum trisulfide, molybdenum pentasulfide and polymolybdenum sulfide, molybdic sulfide, metal salts or amine salts of molybdic sulfide, halogenated molybdenums such as molybdenum chloride, and the like), with sulfur-containing organic compounds (for example, alkyl (thio)xanthates, thiadiazoles, mercaptothiadiazoles, thiocarbonates, tetrahydrocarbylthiuram disulfide, bis(di(thio)hydrocarbyldithio phosphonate)disulfide, organic (poly)sulfides, sulfurized esters and the like), or other organic compounds, or complexes of sulfur-containing molybdenum compounds such as molybdenum sulfide and molybdic sulfide with alkenylsucciniimide s.

The organic molybdenum compound used may be an organic molybdenum compound containing no sulfur as a constituent element.

As organic molybdenum compounds containing no sulfur as a constituent element there may be mentioned, specifically, molybdenum-amine complexes, molybdenum-succiniimide complexes, organic acid molybdenum salts, alcohol molybdenum salts and the like, among which molybdenum-amine complexes, organic acid molybdenum salts and alcohol molybdenum salts are preferred.

When an organic molybdenum compound is used in the lubricating oil composition (III), its content is not particularly restricted but is preferably 0.001% by mass or greater, more preferably 0.005% by mass or greater, even more preferably 0.01% by mass or greater, yet more preferably 0.02% by mass or greater and most preferably 0.04% by mass or greater, and preferably not greater than 0.2% by mass, more preferably not greater than 0.1% by mass, even more preferably not greater than 0.05% by mass and most preferably not greater than 0.03% by mass, as molybdenum element based on the total amount of the composition. If the content is less than 0.001% by mass the heat and oxidation stability of the lubricating oil composition will be insufficient, and in particular it may not be possible to maintain superior cleanability for prolonged periods. On the other hand, if the content is greater than 0.2% by mass the effect will not be commensurate with the increased amount, and the storage stability of the lubricating oil composition will tend to be reduced.

The ashless friction modifier may be any compound ordinarily used as a friction modifier for lubricating oils, and examples include ashless friction modifiers that are amine compounds, ester compounds, amide compounds, imide compounds, ether compounds, urea compounds, hydrazide compounds, fatty acid esters, fatty acid amides, fatty acids, aliphatic alcohols, aliphatic ethers and the like having one or more C6-30 alkyl or alkenyl and especially C6-30 straight-chain alkyl or straight-chain alkenyl groups in the molecule. There may also be mentioned one or more compounds selected from the group consisting of nitrogen-containing compounds represented by the following formulas (5) and (6) and their acid-modified derivatives, and the ashless friction modifiers mentioned in International Patent Publication No. WO2005/037967.

[Chemical Formula 6]

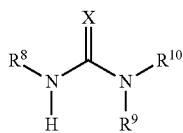

(5)

In formula (5), $R^8$ is a C1-30 hydrocarbon or functional $C_{1}$-30 hydrocarbon group, preferably a C10-30 hydrocarbon or a functional C10-30 hydrocarbon, more preferably a C12-20 alkyl, alkenyl or functional hydrocarbon group and most preferably a C12-20 alkenyl group, $R^9$ and $R^{10}$ are each a $C_{1-30}$ hydrocarbon or functional $C_{1-30}$ hydrocarbon group or hydrogen, preferably a $C_{1-10}$ hydrocarbon or functional $C_{1-10}$ hydrocarbon group or hydrogen, more preferably a $C_{1-4}$ hydrocarbon group or hydrogen and even more preferably hydrogen, and X is oxygen or sulfur and preferably oxygen.

[Chemical Formula 7]

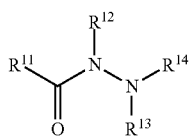

(6)

In formula (6), $R^{11}$ is a C1-30 hydrocarbon or functional C1-30 hydrocarbon group, preferably a C10-30 hydrocarbon or a functional C10-30 hydrocarbon, more preferably a C12-20 alkyl, alkenyl or functional hydrocarbon group and most preferably a C12-20 alkenyl group, $R^{12}$, $R^{13}$ and $R^{14}$ are independently each a C1-30 hydrocarbon or functional C1-30 hydrocarbon group or hydrogen, preferably a C1-10 hydrocarbon or functional C1-10 hydrocarbon group or hydrogen, more preferably a C1-4 hydrocarbon group or hydrogen, and even more preferably hydrogen.

Nitrogen-containing compounds represented by general formula (6) include, specifically, hydrazides with C1-30 hydrocarbon or functional C1-30 hydrocarbon groups, and their derivatives. When $R^{11}$ is a C1-30 hydrocarbon or functional C1-30 hydrocarbon group and $R^{12}$-$R^{14}$ are hydrogen, they are hydrazides containing a C1-30 hydrocarbon group or functional C1-30 hydrocarbon group, and when any of $R^{11}$ and $R^{12}$-$R^{14}$ is a C1-30 hydrocarbon group or functional C1-30 hydrocarbon group and the remaining $R^{12}$-$R^{14}$ groups are hydrogen, they are N-hydrocarbyl hydrazides containing a C1-30 hydrocarbon group or functional C1-30 hydrocarbon group (hydrocarbyl being a hydrocarbon group or the like).

When an ashless friction modifier is used in the lubricating oil composition (III), the content of the ashless friction modifier is preferably 0.01% by mass or greater, more preferably 0.05% by mass or greater, even more preferably 0.1% by mass or greater and most preferably 0.3% by mass or greater, and also preferably not greater than 3% by mass, more preferably not greater than 2% by mass and even more preferably not greater than 1% by mass, based on the total amount of the composition. If the ashless friction modifier content is less than 0.01% by mass the friction reducing effect by the addition will tend to be insufficient, while if it is greater than 3% by mass, the effects of the antiwear property additives may be inhibited, or the solubility of the additives may be reduced.

Either an organic molybdenum compound or an ashless friction modifier alone may be used in the lubricating oil composition (III), or both may be used together, but it is more preferred to use an ashless friction modifier, and it is most preferred to use a fatty acid ester-based ashless friction modifier such as glycerin oleate and/or a urea-based friction modifier such as oleylurea.

As metal-based detergents there may be mentioned normal salts, basic normal salts and overbased salts such as alkali metal sulfonates or alkaline earth metal sulfonates, alkali metal phenates or alkaline earth metal phenates, and alkali metal salicylates or alkaline earth metal salicylates. According to the invention, it is preferred to use one or more alkali metal or alkaline earth metal-based detergents selected from the group consisting of those mentioned above, and especially an alkaline earth metal-based detergent. Particularly preferred are magnesium salts and/or calcium salts, with calcium salts being more preferred.

As ashless dispersants there may be used any ashless dispersants used in lubricating oils, examples of which include mono- or bis-succiniimide s with at least one C40-400 straight-chain or branched alkyl group or alkenyl group in the molecule, benzylamines with at least one C40-400 alkyl group or alkenyl group in the molecule, polyamines with at least one C40-400 alkyl group or alkenyl group in the molecule, and modified forms of the foregoing with boron compounds, carboxylic acids, phosphoric acids and the like. One or more selected from among any of the above may be added for use.

As antioxidants there may be mentioned phenol-based and amine-based ashless antioxidants, and copper-based or molybdenum-based metal antioxidants. Specific examples include phenol-based ashless antioxidants such as 4,4'-methylenebis(2,6-di-tert-butylphenol) and 4,4'-bis(2,6-di-tert-butylphenol), and amine-based ashless antioxidants such as phenyl-α-naphthylamine, alkylphenyl-α-naphthylamine and dialkyldiphenylamine.

As anti-wear agents (or extreme-pressure agents) there may be used any anti-wear agents and extreme-pressure agents that are utilized in lubricating oils. For example, sulfur-based, phosphorus-based and sulfur/phosphorus-based extreme-pressure agents may be used, specific examples of which include phosphorous acid esters, thiophosphorous acid esters, dithiophosphorous acid esters, trithiophosphorous acid esters, phosphoric acid esters, thiophosphoric acid esters, dithiophosphoric acid esters and trithiophosphoric acid esters, as well as their amine salts, metal salts and their derivatives, dithiocarbamates, zinc dithiocarbamate, molybdenum dithiocarbamate, disulfides, polysulfides, olefin sulfides, sulfurized fats and oils, and the like. Sulfur-based extreme-pressure agents, and especially sulfurized fats and oils, are preferably added.

Examples of corrosion inhibitors include benzotriazole-based, tolyltriazole-based, thiadiazole-based and imidazole-based compounds.

Examples of rust-preventive agents include petroleum sulfonates, alkylbenzene sulfonates, dinonylnaphthalene sulfonates, alkenylsuccinic acid esters and polyhydric alcohol esters.

Examples of pour point depressants that may be used include polymethacrylate-based polymers suitable for the lubricating base oil used.

As examples of demulsifiers there may be mentioned polyalkylene glycol-based nonionic surfactants such as polyoxyethylenealkyl ethers, polyoxyethylenealkylphenyl ethers and polyoxyethylenealkylnaphthyl ethers.

Examples of metal deactivating agents include imidazolines, pyrimidine derivatives, alkylthiadiazoles, mercaptobenzothiazoles, benzotriazole and its derivatives, 1,3,4-thiadiazolepolysulfide, 1,3,4-thiadiazolyl-2,5-bisdialkyl dithiocarbamate, 2-(alkyldithio)benzimidazole and β-(o-carboxybenzylthio)propionitrile.

As examples of antifoaming agents there may be mentioned silicone oils, alkenylsuccinic acid derivatives, polyhydroxyaliphatic alcohol and long-chain fatty acid esters, methyl salicylate and o-hydroxybenzyl alcohols, which have kinematic viscosities at 25° C. of 0.1-100 mm$^2$/s.

When such additives are added to the lubricating oil composition (III), their contents are 0.01-10% by mass based on the total amount of the composition.

The kinematic viscosity at 100° C. of the lubricating oil composition (III) must be 4-12 mm$^2$/s, and it is preferably 4.5 mm$^2$/s or greater, more preferably 5 mm$^2$/s or greater and most preferably 6 mm$^2$/s or greater. It is also preferably not greater than 10 mm$^2$/s, more preferably not greater than 9 mm$^2$/s and most preferably not greater than 8 mm$^2$/s. If the kinematic viscosity at 100° C. is less than 4 mm$^2$/s, insufficient lubricity may result, and if it is greater than 12 mm$^2$/s it may not be possible to obtain the necessary low-temperature viscosity and sufficient fuel efficiency performance.

The viscosity index of the lubricating oil composition (III) must be in the range of 140-300, but it is preferably 190-300, more preferably 200-300, even more preferably 210-300, yet more preferably 220-300, even yet more preferably 240-300 and most preferably 250-300. If the viscosity index of the lubricating oil composition of the invention is less than 140 it may be difficult to maintain the HTHS viscosity while improving fuel efficiency, and it may also be difficult to lower the −35° C. low-temperature viscosity. In addition, if the viscosity index of the lubricating oil composition of the invention is higher than 300, the low-temperature flow property may be poor and problems may occur due to solubility of the additives or lack of compatibility with the sealant material.

The lubricating oil composition (III) preferably satisfies the following conditions, in addition to satisfying the aforementioned conditions for the kinematic viscosity at 100° C. and viscosity index.

The kinematic viscosity at 40° C. of the lubricating oil composition (III) is preferably 4-50 mm$^2$/s, more preferably 10 mm$^2$/s or greater, even more preferably 15 mm$^2$/s or greater, yet more preferably 20 mm$^2$/s or greater and most preferably 25 mm$^2$/s or greater. It is also preferably not greater than 40 mm$^2$/s, more preferably not greater than 35 mm$^2$/s, even more preferably not greater than 32 mm$^2$/s and most preferably not greater than 30 mm$^2$/s. If the kinematic viscosity at 40° C. is less than 4 mm$^2$/s, insufficient lubricity may result, and if it is greater than 50 mm$^2$/s it may not be possible to obtain the necessary low-temperature viscosity and sufficient fuel efficiency performance.

The HTHS viscosity at 100° C. of the lubricating oil composition (III) is preferably not greater than 6.0 mPa·s, more preferably not greater than 5.5 mPa·s, even more preferably not greater than 5.0 mPa·s, yet more preferably not greater than 4.8 mPa·s and most preferably not greater than 4.5 mPa·s. It is also preferably 3.0 mPa·s or greater, preferably 3.5 mPa·s or greater, more preferably 3.8 mPa·s or greater, even more preferably 4.0 mPa·s or greater and most preferably 4.2 mPa·s or greater. The HTHS viscosity at 100° C. is the high-temperature high-shear viscosity at 100° C. according to ASTM D4683. If the HTHS viscosity at 100° C. is less than 3.0 mPa·s, the evaporation property may be high and insufficient lubricity may result, and if it is greater than 6.0 mPa·s it may not be possible to obtain the necessary low-temperature viscosity and sufficient fuel efficiency performance.

The HTHS viscosity at 150° C. of the lubricating oil composition (III) is preferably not greater than 3.5 mPa·s, more preferably not greater than 3.0 mPa·s, even more preferably not greater than 2.8 mPa·s and most preferably not greater than 2.7 mPa·s. It is also preferably 2.0 mPa·s or greater, preferably 2.3 mPa·s or greater, more preferably 2.4 mPa·s or greater, even more preferably 2.5 mPa·s or greater and most preferably 2.6 mPa·s or greater. The HTHS viscosity at 150° C. referred to here is the high-temperature high-shear viscosity at 150° C., specified by ASTM ASTM D4683. If the HTHS viscosity at 150° C. is less than 2.0 mPa·s, the evaporation property may be high and insufficient lubricity may result, and if it is greater than 3.5 mPa·s, it may not be possible to obtain the necessary low-temperature viscosity and sufficient fuel efficiency performance.

Also, the ratio of the HTHS viscosity at 100° C. with respect to the HTHS viscosity at 150° C. in the lubricating oil composition (III) preferably satisfies the condition represented by the following inequality (A).

$$\text{HTHS}(100° \text{ C.})/\text{HTHS}(150° \text{ C.}) \leq 2.04 \qquad (A)$$

[In the inequality, HTHS (100° C.) represents the HTHS viscosity at 100° C. and HTHS (150° C.) represents the HTHS viscosity at 150° C.]

The HTHS (100° C.)/HTHS (150° C.) ratio is preferably not greater than 2.04 as mentioned above, and it is more preferably not greater than 2.00, even more preferably not greater than 1.98, yet more preferably not greater than 1.80 and most preferably not greater than 1.70. If HTHS (100° C.)/HTHS (150° C.) is greater than 2.04, it may not be possible to obtain sufficient fuel efficiency performance or low-temperature characteristics. Also, HTHS (100° C.)/HTHS (150° C.) is preferably 0.50 or greater, more preferably 0.70 or greater, even more preferably 1.00 or greater and most preferably 1.30 or greater. If HTHS (100° C.)/HTHS (150° C.) is less than 0.50, the cost of the base stock may be drastically increased and solubility of the additives may not be achieved.

The NOACK evaporation of the lubricating oil composition (III) is preferably 8% by mass or greater, more preferably 11% by mass or greater, even more preferably 16% by mass or greater and yet more preferably 18% by mass or greater, and also preferably not greater than 30% by mass, more preferably not greater than 25% by mass and most preferably not greater than 22% by mass. In particular, a NOACK evaporation of 18-20% by mass will allow a satisfactory balance to be obtained between evaporation loss prevention, low-temperature characteristics and fuel efficiency performance.

The lubricating oil composition (III), having such a construction, is superior in terms of fuel efficiency, low evaporation property and low-temperature viscosity characteristic, and can exhibit fuel efficiency and both NOACK evaporation and low-temperature viscosity at −35° C. and below while maintaining HTHS viscosity at 150° C., even without using a synthetic oil such as a poly-α-olefinic base oil or esteric base oil, or a low-viscosity mineral base oil, and in particular it can reduce the kinematic viscosity at 40° C. and 100° C. and the HTHS viscosity at 100° C., while also notably improving the CCS viscosity at −35° C. (MRV viscosity at −40° C.), of the lubricating oil. For example, with the lubricating oil composition of the invention it is possible to obtain a CCS viscosity at −35° C. of 4500 mPa·s or below. With the lubricating oil composition of the invention it is also possible to obtain a MRV viscosity at −40° C. of 10,000 mPa·s or below.

EXAMPLES

The present invention will now be explained in greater detail based on examples and comparative examples, with the understanding that these examples are in no way limitative on the invention.

Examples 1-1 to 1-6, Comparative Example 1-1

Example 1-1

For Example 1-1, first a fraction separated by vacuum distillation in a process for refining of solvent refined base oil was subjected to solvent extraction with furfural and then hydrotreatment, which was followed by solvent dewaxing with a methyl ethyl ketone-toluene mixed solvent. The wax portion removed during solvent dewaxing and obtained as slack wax (hereunder, "WAX1") was used as the feed stock oil for the lubricating base oil. The properties of WAX1 are shown in Table 1.

TABLE 1

| Name of crude wax | WAX1 |
|---|---|
| Kinematic viscosity at 100° C., mm²/s | 6.3 |
| Melting point, ° C. | 53 |
| Oil content, % by mass | 19.9 |
| Sulfur content, ppm by mass | 1900 |

WAX1 was then used as the feed stock oil for hydrotreatment with a hydrotreatment catalyst. The reaction temperature and liquid space velocity were modified for a feed stock oil cracking severity of at least 5% by mass and a sulfur content of not greater than 10 ppm by mass in the oil to be treated. Here, a "feed stock oil cracking severity of at least 5% by mass" means that the proportion of the fraction lighter than the initial boiling point of the feed stock oil in the oil to be treated is at least 5% by mass with respect to the total feed stock oil amount, and this is confirmed by gas chromatography distillation.

Next, the treated product obtained from the hydrotreatment was subjected to hydrodewaxing in a temperature range of 315° C.-325° C. using a zeolite-based hydrodewaxing catalyst adjusted to a precious metal content of 0.1-5% by mass.

The treated product (raffinate) obtained by this hydrodewaxing was subsequently treated by hydrorefining using a hydrorefining catalyst. Next, the light and heavy portions were separated by distillation to obtain a lubricating base oil having the composition and properties shown in Table 4. In Table 4, the row headed "Proportion of normal paraffin-derived components in urea adduct" contains the values obtained by gas chromatography of the urea adduct obtained during measurement of the urea adduct value (same hereunder).

Example 1-2

For Example 1-2 there was used an FT wax with a paraffin content of 95% by mass and a carbon number distribution of 20-80 (hereunder, "WAX2"). The properties of WAX2 are shown in Table 2.

TABLE 2

| Name of crude wax | WAX2 |
|---|---|
| Kinematic viscosity at 100° C., mm²/s | 5.8 |
| Melting point, ° C. | 70 |
| Oil content, % by mass | <1 |
| Sulfur content, ppm by mass | <0.2 |

Hydrotreatment, hydrodewaxing, hydrorefining and distillation were carried out in the same manner as in Example 1-1, except for using WAX2 instead of WAX1, to obtain a lubricating base oil having the composition and properties listed in Table 4.

Example 1-3

For Example 1-3, the wax portion obtained by further deoiling of WAX1 (hereunder, "WAX3") was used as the feed stock oil for the lubricating base oil. The properties of WAX3 are shown in Table 3.

TABLE 3

| Name of crude wax | WAX3 |
|---|---|
| Knematic viscosity at 100° C., (mm²/s) | 6.8 |
| Melting point, ° C. | 58 |
| Oil content, % by mass | 6.3 |
| Sulfur content, ppm by mass | 900 |

Hydrotreatment, hydrodewaxing, hydrorefining and distillation were carried out in the same manner as in Example 1-1, except for using WAX3 instead of WAX1, to obtain a lubricating base oil having the composition and properties listed in Table 4.

Example 1-4

A lubricating base oil having the composition and properties shown in Table 5 was produced in the same manner as Example 1-1, except that the hydrodewaxing temperature in Example 1-1 was changed to 300° C. or higher and below 315° C.

Example 1-5

A lubricating base oil having the composition and properties shown in Table 5 was produced in the same manner as Example 1-2, except that the hydrodewaxing temperature in Example 1-2 was changed to 300° C. or higher and below 315° C.

Example 1-6

A lubricating base oil having the composition and properties shown in Table 5 was produced in the same manner as Example 1-3, except that the hydrodewaxing temperature in Example 1-3 was changed to 305° C. or higher and below 315° C.

Comparative Example 1-1

Also, a lubricating base oil was prepared having the composition and properties shown in Table 6, as a conventional lubricating base oil obtained using WAX1.

A polymethacrylate-based pour point depressant (weight-average molecular weight: approximately 60,000) commonly used in automobile lubricating oils was added to each of the lubricating base oils of Examples 1-1 to 1-6 and Comparative Example 1-1 to obtain lubricating oil compositions. The pour point depressant was added in three different amounts of 0.3% by mass, 0.5% by mass and 1.0% by mass based on the total amount of the composition, for both Examples 1 to 6 and Comparative Example 1. The MRV viscosity at −40° C. of each of the obtained lubricating oil compositions was then measured. The results are shown in Tables 4 to 6.

TABLE 4

|  |  | Example 1-1 | Example 1-2 | Example 1-3 |
|---|---|---|---|---|
| Feed stock oil | | WAX1 | WAX2 | WAX3 |
| Urea adduct value, % by mass | | 1.25 | 2.18 | 3.76 |
| Proportion of normal paraffin-derived components in urea adduct, % by mass | | 2.4 | 2.5 | 2.1 |
| ε-Methylene carbon ratio | | 0.151 | 0.177 | 0.162 |
| Average branching number | | 2.15 | 2.30 | 2.25 |
| Percentage of tertiary carbon atoms within the fourth carbon atoms from terminal carbon atom of main chain of total tertiary carbon atoms, % | | 40 | 35 | 52 |
| Average of carbon atoms number | | 27.9 | 29.1 | 30.2 |
| Base oil composition (based on total base oil) | Saturated components, % by mass | 99.7 | 99.8 | 99.8 |
|  | Aromatic components, % by mass | 0.2 | 0.1 | 0.2 |
|  | Polar compound components, % by mass | 0.1 | 0.1 | 0 |
| Saturated components content (based on total saturated components) | Cyclic saturated components, % by mass | 11.5 | 9.2 | 10.3 |
|  | Acyclic saturated components, % by mass | 88.5 | 90.8 | 89.7 |
| Acyclic saturated components content (based on total acyclic saturated components) | Normal paraffins, % by mass | 0 | 0 | 0 |
|  | Isoparaffins, % by mass | 100 | 100 | 100 |
| Sulfur content, ppm by mass | | <1 | <10 | <10 |
| Nitrogen content, ppm by mass | | <3 | <3 | <3 |
| Kinematic viscosity (40° C.), mm$^2$/s | | 15.56 | 15.78 | 16.26 |
| Kinematic viscosity (100° C.), mm$^2$/s | | 3.82 | 3.86 | 3.92 |
| Viscosity index | | 141 | 143 | 142 |
| Density (15° C.), g/cm$^3$ | | 0.8195 | 0.8180 | 0.819 |
| Pour point, ° C. | | −22.5 | −25 | −22.5 |
| Freezing point, ° C. | | −24 | −27 | −25 |
| Iodine value | | 0.05 | 0.06 | 0.04 |
| Aniline point, ° C. | | 118.4 | 119.2 | 119.1 |
| Distillation properties, ° C. | IBP, ° C. | 380.2 | 378.4 | 379.5 |
|  | T10, ° C. | 404.2 | 402.8 | 403.8 |
|  | T50, ° C. | 433.8 | 430.5 | 431.5 |
|  | T90, ° C. | 458.8 | 457.9 | 457.9 |
|  | FBP, ° C. | 482.6 | 480.3 | 481.5 |
| CCS viscosity (−35° C.), mPa·s | | 1,380 | 1,240 | 1,470 |
| BF viscosity (−30° C.), mPa·s | | 5,300 | 4,800 | 5,400 |
| MRV viscosity (−40° C.), mPa·s | 0.3% by mass Pour point depressant | 5,900 | 5,200 | 6,100 |
|  | 0.5% by mass Pour point depressant | 5,600 | 5,400 | 5,800 |
|  | 1.0% by mass Pour point depressant | 6,100 | 5,700 | 6,300 |

TABLE 5

|  |  | Example 1-4 | Example 1-5 | Example 1-6 |
|---|---|---|---|---|
| Feed stock oil |  | WAX1 | WAX2 | WAX3 |
| Urea adduct value, % by mass |  | 1.45 | 1.33 | 1.07 |
| Proportion of normal paraffin-derived components in urea adduct, % by mass |  | 2.4 | 2.9 | 2.5 |
| $\epsilon$-Methylene carbon ratio |  | 0.135 | 0.155 | 0.205 |
| Average branching number |  | 2.15 | 2.22 | 1.95 |
| Percentage of tertiary carbon atoms within the fourth carbon atoms from terminal carbon atom of main chain of total tertiary carbon atoms, % |  | 40 | 20 | 35 |
| Average of carbon atoms number |  | 28.8 | 28.9 | 27.3 |
| Base oil composition (based on total base oil) | Saturated components, % by mass | 99.6 | 99.1 | 99.5 |
|  | Aromatic components, % by mass | 0.2 | 0.8 | 0.3 |
|  | Polar compound components, % by mass | 0.2 | 0.1 | 0.2 |
| Saturated components content (based on total saturated components) | Cyclic saturated components, % by mass | 11.1 | 13.8 | 10.3 |
|  | Acyclic saturated components, % by mass | 88.9 | 86.2 | 89.7 |
| Acyclic saturated components content (based on total acyclic saturated components) | Normal paraffins, % by mass | 0 | 0 | 0 |
|  | Isoparaffins, % by mass | 100 | 100 | 100 |
| Sulfur content, ppm by mass |  | <10 | <10 | <10 |
| Nitrogen content, ppm by mass |  | <3 | <3 | <3 |
| Kinematic viscosity (40° C.), mm$^2$/s |  | 15.78 | 15.78 | 14.71 |
| Kinematic viscosity (100° C.), mm$^2$/s |  | 3.86 | 3.862 | 3.743 |
| Viscosity index |  | 132 | 130 | 150 |
| Density (15° C.), g/cm$^3$ |  | 0.8183 | 0.8185 | 0.8180 |
| Pour point, ° C. |  | −25 | −30 | −17.5 |
| Freezing point, ° C. |  | −27 | −32 | −18 |
| Iodine value |  | 0.04 | 0.12 | 0.06 |
| Aniline point, ° C. |  | 118.9 | 117.8 | 120.2 |
| Distillation properties, ° C. | IBP, ° C. | 370.5 | 369.2 | 385.2 |
|  | T10, ° C. | 394.3 | 392.1 | 410.3 |
|  | T50, ° C. | 435.2 | 433.2 | 433.8 |
|  | T90, ° C. | 460.3 | 457.5 | 461.5 |
|  | FBP, ° C. | 485.8 | 482.8 | 487.6 |
| CCS viscosity (−35° C.), mPa · s |  | 1,540 | 2,020 | 2,800 |
| BF viscosity (−30° C.), mPa · s |  | 4,800 | 3,900 | 9,300 |
| MRV viscosity (−40° C.), mPa · s | 0.3% by mass Pour point depressant | 7,300 | 7,100 | 10,500 |
|  | 0.5% by mass Pour point depressant | 7,500 | 7,300 | 10,100 |
|  | 1.0% by mass Pour point depressant | 7,900 | 8,200 | 11,200 |

TABLE 6

|  |  | Comp. Ex. 1-1 |
|---|---|---|
| Feed stock oil |  | WAX1 |
| Urea adduct value, % by mass |  | 4.51 |
| Proportion of normal paraffin-derived components in urea adduct, % by mass |  | 3.4 |
| $\epsilon$-Methylene carbon ratio |  | 0.168 |
| Average branching number |  | 1.71 |
| Percentage of tertiary carbon atoms within the fourth carbon atoms from terminal carbon atom of main chain of total tertiary carbon atoms, % |  | 40 |
| Average of carbon atoms number |  | 29.8 |
| Base oil composition (based on total base oil) | Saturated components, % by mass | 99.6 |
|  | Aromatic components, % by mass | 0.2 |
|  | Polar compound components, % by mass | 0.2 |
| Saturated components content (based on total saturated components) | Cyclic saturated components, % by mass | 11.1 |
|  | Acyclic saturated components, % by mass | 88.9 |
| Acyclic saturated components content (based on total acyclic saturated components) | Normal paraffins, % by mass | 0 |
|  | Isoparaffins, % by mass | 100 |
| Sulfur content, ppm by mass |  | <10 |
| Nitrogen content, ppm by mass |  | <3 |
| Kinematic viscosity (40° C.), mm$^2$/s |  | 16.10 |
| Kinematic viscosity (100° C.), mm$^2$/s |  | 3.925 |
| Viscosity index |  | 143 |
| Density (15° C.), g/cm$^3$ |  | 0.8179 |
| Pour point, ° C. |  | −20 |
| Freezing point, ° C. |  | −22 |
| Iodine value |  | 0.05 |
| Aniline point, ° C. |  | 119.2 |
| Distillation properties | IBP, ° C. | 358.5 |
|  | T10, ° C. | 393.7 |
|  | T50, ° C. | 440.2 |
|  | T90, ° C. | 466.3 |
|  | FBP, ° C. | 486.2 |
| CCS viscosity (−35° C.), mPa · s |  | 3,740 |
| BF viscosity (−30° C.), mPa · s |  | 12,800 |

TABLE 6-continued

|  |  | Comp. Ex. 1-1 |
|---|---|---|
| MRV viscosity (−40° C.), mPa · s | 0.3% by mass Pour point depressant | 14,500 |
|  | 0.5% by mass Pour point depressant | 14,000 |
|  | 1.0% by mass Pour point depressant | 15,300 |

Examples 2-1 to 2-6, Comparative Example 2-1

Example 2-1

For Example 2-1, WAX1 was used as the feed stock oil for hydrotreatment with a hydrotreatment catalyst. The reaction temperature and liquid space velocity were modified for a feed stock oil cracking severity of at least 5% by mass and a sulfur content of not greater than 10 ppm by mass in the oil to be treated. Here, a "feed stock oil cracking severity of at least 5% by mass" means that the proportion of the fraction lighter than the initial boiling point of the feed stock oil in the oil to be treated is at least 5% by mass with respect to the total feed stock oil amount, and this is confirmed by gas chromatography distillation.

Next, the treated product obtained from the hydrotreatment was subjected to hydrodewaxing in a temperature range of 315° C.-325° C. using a zeolite-based hydrodewaxing catalyst adjusted to a precious metal content of 0.1-5% by mass.

The treated product (raffinate) obtained by this hydrodewaxing was subsequently treated by hydrorefining using a hydrorefining catalyst. Next, the heart-cut and heavy fractions were separated by distillation to obtain a lubricating base oil having the composition and properties shown in Table 7.

Example 2-2

For Example 2-2, hydrotreatment, hydrodewaxing, hydrorefining and distillation were carried out in the same manner as in Example 2-1, except for using WAX2 instead of WAX1, to obtain a lubricating base oil having the composition and properties listed in Table 7.

Example 2-3

For Example 2-3, hydrotreatment, hydrodewaxing, hydrorefining and distillation were carried out in the same manner as in Example 2-1, except for using WAX3 instead of WAX1, to obtain a lubricating base oil having the composition and properties listed in Table 7.

Example 2-4

A lubricating base oil having the composition and properties shown in Table 8 was produced in the same manner as Example 2-1, except that the hydrodewaxing reaction temperature in Example 2-1 was changed to 300° C. or higher and below 315° C.

Example 2-5

A lubricating base oil having the composition and properties shown in Table 8 was produced in the same manner as Example 2-2, except that the hydrodewaxing reaction temperature in Example 2-2 was changed to 300° C. or higher and below 315° C.

Example 2-6

A lubricating base oil having the composition and properties shown in Table 8 was produced in the same manner as Example 2-3, except that the hydrodewaxing reaction temperature in Example 2-3 was changed to 300° C. or higher and below 315° C.

Comparative Example 2-1

A lubricating base oil was also prepared having the composition and properties shown in Table 9, as a conventional lubricating base oil obtained using WAX1.

TABLE 7

|  |  | Example 2-1 | Example 2-2 | Example 2-3 |
|---|---|---|---|---|
| Feed stock oil |  | WAX1 | WAX2 | WAX3 |
| Urea adduct value, % by mass |  | 2.25 | 3.82 | 2.18 |
| Proportion of normal paraffin-derived components in urea adduct, % by mass |  | 2.4 | 2.8 | 2.5 |
| ε-Methylene carbon ratio |  | 0.127 | 0.158 | 0.147 |
| Average branching number |  | 2.15 | 1.85 | 2.02 |
| Percentage of tertiary carbon atoms within the fourth carbon atoms from terminal carbon atom of main chain of total tertiary carbon atoms, % |  | 42 | 45 | 35 |
| Average of carbon atoms number |  | 23.5 | 26.8 | 24.8 |
| Base oil composition (based on total base oil) | Saturated components, % by mass | 99.6 | 99.7 | 99.8 |
|  | Aromatic components, % by mass | 0.3 | 0.2 | 0.1 |
|  | Polar compound components, % by mass | 0.1 | 0.1 | 0.1 |
| Saturated components content (based on total saturated components) | Cyclic saturated components, % by mass | 12.3 | 13.5 | 13.1 |
|  | Acyclic saturated components, % by mass | 87.7 | 86.5 | 86.9 |
| Acyclic saturated components content (based on total acyclic saturated components) | Normal paraffins, % by mass | 0 | 0 | 0 |
|  | Isoparaffins, % by mass | 100 | 100 | 100 |
| Sulfur content, ppm by mass |  | <1 | <10 | <10 |
| Nitrogen content, ppm by mass |  | <3 | <3 | <3 |

TABLE 7-continued

|  |  | Example 2-1 | Example 2-2 | Example 2-3 |
|---|---|---|---|---|
| Kinematic viscosity (40° C.), mm$^2$/s |  | 9.07 | 9.86 | 9.57 |
| Kinematic viscosity (100° C.), mm$^2$/s |  | 2.61 | 2.78 | 2.72 |
| Viscosity index |  | 128 | 131 | 128 |
| Density (15° C.), g/cm$^3$ |  | 0.8087 | 0.8095 | 0.8088 |
| Pour point, ° C. |  | −45 | −35 | −42.5 |
| Freezing point, ° C. |  | <−45 | −37 | −43 |
| Iodine value |  | 0.05 | 0.07 | 0.05 |
| Aniline point, ° C. |  | 112.8 | 113.5 | 113.1 |
| Distillation properties, ° C. | IBP, ° C. | 310.7 | 308.8 | 312.5 |
|  | T10, ° C. | 349.3 | 349.5 | 350.1 |
|  | T50, ° C. | 382.6 | 380.2 | 380.6 |
|  | T90, ° C. | 404.3 | 404.1 | 403.8 |
|  | FBP, ° C. | 421.2 | 421.5 | 420.2 |
| BF viscosity (−30° C.), mPa·s |  | 800 | 1,600 | 1,100 |

TABLE 8

|  |  | Example 2-4 | Example 2-5 | Example 2-6 |
|---|---|---|---|---|
| Feed stock oil |  | WAX1 | WAX2 | WAX3 |
| Urea adduct value, % by mass |  | 1.45 | 1.07 | 1.33 |
| Proportion of normal paraffin-derived components in urea adduct, % by mass |  | 2.4 | 2.5 | 2.9 |
| ε-Methylene carbon ratio |  | 0.115 | 0.195 | 0.155 |
| Average branching number |  | 2.15 | 1.95 | 2.22 |
| Percentage of tertiary carbon atoms within the fourth carbon atoms from terminal carbon atom of main chain of total tertiary carbon atoms, % |  | 55 | 35 | 65 |
| Average of carbon atoms number |  | 24.9 | 24.8 | 25.1 |
| Base oil composition (based on total base oil) | Saturated components, % by mass | 99.2 | 99.4 | 99.3 |
|  | Aromatic components, % by mass | 0.6 | 0.3 | 0.3 |
|  | Polar compound components, % by mass | 0.2 | 0.3 | 0.4 |
| Saturated components content (based on total saturated components) | Cyclic saturated components, % by mass | 12.5 | 13.3 | 13.1 |
|  | Acyclic saturated components, % by mass | 87.5 | 86.7 | 86.9 |
| Acyclic saturated components content (based on total acyclic saturated components) | Normal paraffins, % by mass | 0 | 0 | 0 |
|  | Isoparaffins, % by mass | 100 | 100 | 100 |
| Sulfur content, ppm by mass |  | <10 | <10 | <10 |
| Nitrogen content, ppm by mass |  | <3 | <3 | <3 |
| Kinematic viscosity (40° C.), mm$^2$/s |  | 9.72 | 9.86 | 9.82 |
| Kinematic viscosity (100° C.), mm$^2$/s |  | 2.72 | 2.75 | 2.80 |
| Viscosity index |  | 122 | 123 | 126 |
| Density (15° C.), g/cm$^3$ |  | 0.8082 | 0.8079 | 0.8091 |
| Pour point, ° C. |  | −45 | −37.5 | −35 |
| Freezing point, ° C. |  | <−45 | −38 | −36 |
| Iodine value |  | 0.05 | 0.09 | 0.04 |
| Aniline point, ° C. |  | 112.5 | 113.2 | 112.8 |
| Distillation properties, ° C. | IBP, ° C. | 313.5 | 309.8 | 310.7 |
|  | T10, ° C. | 351.3 | 350.2 | 353.8 |
|  | T50, ° C. | 385.4 | 388.5 | 392.1 |
|  | T90, ° C. | 406.8 | 405.1 | 407.1 |
|  | FBP, ° C. | 422.5 | 421.8 | 419.4 |
| BF viscosity (−30° C.), mPa·s |  | 3,500 | 4,300 | 3,200 |

TABLE 9

|  | Comp. Ex. 2-1 |
|---|---|
| Feed stock oil | WAX1 |
| Urea adduct value, % by mass | 4.45 |
| Proportion of normal paraffin-derived components in urea adduct, % by mass | 2.8 |
| ε-Methylene carbon ratio | 0.115 |
| Average branching number | 2.15 |
| Percentage of tertiary carbon atoms within the fourth carbon atoms from terminal carbon atom of main chain of total tertiary carbon atoms, % | 55 |
| Average of carbon atoms number | 25.1 |

TABLE 9-continued

|  |  | Comp. Ex. 2-1 |
|---|---|---|
| Base oil composition (based on total base oil) | Saturated components, % by mass | 92.8 |
|  | Aromatic components, % by mass | 6.6 |
|  | Polar compound components, % by mass | 0.6 |
| Saturated components content (based on total saturated components) | Cyclic saturated components, % by mass | 14.8 |
|  | Acyclic saturated components, % by mass | 85.2 |
| Acyclic saturated components content(based on total acyclic saturated components) | Normal paraffins, % by mass | 0 |
|  | Isoparaffins, % by mass | 100 |
| Sulfur content, ppm by mass |  | <10 |
| Nitrogen content, ppm by mass |  | <3 |
| Kinematic viscosity (40° C.), mm$^2$/s |  | 9.45 |
| Kinematic viscosity (100° C.), mm$^2$/s |  | 2.68 |
| Viscosity index |  | 125 |
| Density (15° C.), g/cm$^3$ |  | 0.8089 |
| Pour point, ° C. |  | −37.5 |
| Freezing point, ° C. |  | −38 |
| Iodine value |  | 0.08 |
| Aniline point, ° C. |  | 111.5 |
| Distillation properties, ° C. | IBP, ° C. | 309.5 |
|  | T10, ° C. | 355.1 |
|  | T50, ° C. | 385.7 |
|  | T90, ° C. | 409.5 |
|  | FBP, ° C. | 430.2 |
| BF viscosity (−30° C.), mPa · s |  | 6,500 |

Examples 3-1 to 3-6, Comparative Examples 3-1 to 3-4

For Examples 3-1 to 3-6 and Comparative Examples 3-1 to 3-4 there were prepared lubricating oil compositions having the compositions shown in Table 12, using the following base oils and additives. The conditions for preparation of each lubricating oil composition were for a HTHS viscosity at 150° C. in the range of 2.55-2.65. The properties of base oils 1-5 are shown in Tables 10 and 11.

(Base Oils)

O-1 (Base oil 1): Mineral oil obtained by hydrocracking/hydroisomerization of n-paraffin-containing oil O-2 (Base oil 2): Mineral oil obtained by hydrocracking/hydroisomerization of n-paraffin-containing oil O-3 (Base oil 3): Mineral oil obtained by hydrocracking/hydroisomerization of n-paraffin-containing oil O-4 (Base oil 4): Hydrocracked base oil O-5 (Base oil 5): Hydrocracked/hydroisomerized base oil (Additives)

A-1 (Viscosity index improver 1): Non-dispersed polymethacrylate-based additive with PSSI=20, $M_W$=400,000, $M_W$/PSSI=2×10$^4$ (copolymer obtained by polymerizing 90% by mole of a mixture of alkyl methacrylates (alkyl groups: methyl, C12-15 straight-chain alkyl groups, C16-20 straight-chain alkyl groups) and 10% by mole of alkyl methacrylates having C22 branched-chain alkyl groups, as the main structural unit).

A-2 (Viscosity index improver 2): Dispersed polymethacrylate-based additive with PSSI=40, $M_W$=300,000, $M_W$/Mn=4.0, $M_W$/PSSI=7.25×10$^3$ (copolymer obtained by polymerizing a mixture of dimethylaminoethyl methacrylate and alkyl methacrylates (alkyl groups: methyl, C12-15 straight-chain alkyl groups) as the main structural unit).

A-3 (Viscosity index improver 3): Dispersed polymethacrylate-based additive with PSSI=28, $M_W$=200,000, $M_W$/Mn=4.3, $M_W$/PSSI=7.14×10$^3$ (copolymer obtained by polymerizing a mixture of dimethylaminoethyl methacrylate and alkyl methacrylates (alkyl groups: methyl, C12-15 straight-chain alkyl groups, C16-18 straight-chain alkyl groups) as the main structural unit).

B-1 (Other additives): Additive package (containing metal-based detergent (Ca salicylate, Ca: 2000 ppm), ashless dispersant (borated polybutenylsucciniimide), antioxidants (phenol-based, amine-based), anti-wear agent (zinc alkylphosphate, P: 800 ppm), friction modifier (MoDTC, Mo: 400 ppm), ester-based ashless friction modifier, urea-based ashless friction modifier, pour point depressant, antifoaming agent and other components).

TABLE 10

|  |  | Base oil 1 | Base oil 2 | Base oil 3 |
|---|---|---|---|---|
| Urea adduct value, % by mass |  | 0.9 | 1.3 | 3.8 |
| Proportion of normal paraffin-derived components in urea adduct, % by mass |  | <0.1 | <0.1 | <0.1 |
| ε-Methylene carbon ratio |  | 0.13 | 0.14 | 0.16 |
| Average branching number |  | 1.8 | 2.1 | 2.1 |
| Percentage of tertiary carbon atoms within the fourth carbon atoms from terminal carbon atom of main chain of total tertiary carbon atoms, % |  | 64 | 51 | 43 |
| Average of carbon atoms number |  | 23.2 | 28.5 | 29.3 |
| Kinematic viscosity (40° C.), mm$^2$/s |  | 12.6 | 15.8 | 16.3 |
| Kinematic viscosity (100° C.), mm$^2$/s |  | 3.3 | 3.9 | 3.9 |
| Viscosity index |  | 133 | 143 | 142 |
| Pour point, ° C. |  | −27.5 | −25 | −22.5 |
| Iodine value |  | 0.05 | 0.06 | 0.04 |
| Sulfur content, ppm by mass |  | <1 | <1 | <1 |
| Nitrogen content, ppm by mass |  | <3 | <3 | <3 |
| Distillation properties, ° C. | IBP | 352 | 375 | 380 |
|  | T5 | 373 | 395 | 394 |
|  | T10 | 382 | 403 | 404 |
|  | T20 | 393 | 414 | 415 |
|  | T30 | 401 | 422 | 423 |
|  | T50 | 414 | 434 | 432 |
|  | T70 | 425 | 446 | 448 |

TABLE 10-continued

|  | Base oil 1 | Base oil 2 | Base oil 3 |
|---|---|---|---|
| T90 | 439 | 459 | 456 |
| FBP | 458 | 483 | 482 |
| % Cp, % | 92.7 | 92.6 | 91.5 |
| % Cn, % | 7.3 | 7.4 | 8.3 |
| Ratio of kinematic viscosity (100° C.) and 10% distillation temperature | 0.0086 | 0.0096 | 0.0101 |
| Ratio of kinematic viscosity (100° C.) and 20% distillation temperature | 0.0084 | 0.0093 | 0.0096 |
| Ratio of kinematic viscosity (100° C.) and 50% distillation temperature | 0.0079 | 0.0089 | 0.0092 |
| Difference between 5% distillation temperature and 90% distillation temperature (T90-T5), ° C. | 66 | 64.9 | 62 |

TABLE 11

|  |  | Base oil 4 | Base oil 5 |
|---|---|---|---|
| Urea adduct value, % by mass |  | 4.6 | 2.8 |
| Proportion of normal paraffin-derived components in urea adduct, % by mass |  | <0.1 | <0.1 |
| ε-Methylene carbon ratio |  | 0.17 | 0.19 |
| Average branching number |  | 2.3 | 2.4 |
| Percentage of tertiary carbon atoms within the fourth carbon atoms from terminal carbon atom of main chain of total tertiary carbon atoms, % |  | 33 | 28 |
| Average of carbon atoms number |  | 30.2 | 30.9 |
| Kinematic viscosity (40° C.), mm²/s |  | 18.7 | 20.0 |
| Kinematic viscosity (100° C.), mm²/s |  | 4.1 | 4.3 |
| Viscosity index |  | 120 | 123 |
| Pour point, ° C. |  | −22.5 | −17.5 |
| Iodine value |  | 0.79 | 0.05 |
| Sulfur content, ppm by mass |  | 2 | <1 |
| Nitrogen content, ppm by mass |  | <3 | <3 |
| Distillation properties, ° C. | IBP | 325 | 314 |
|  | T5 | 373 | 381 |
|  | T10 | 383 | 393 |
|  | T20 | 396 | 406 |
|  | T30 | 405 | 414 |
|  | T50 | 420 | 426 |
|  | T70 | 436 | 439 |
|  | T90 | 458 | 459 |
|  | FBP | 495 | 505 |
| % Cp, % |  | 80.7 | 50.6 |
| % Cn, % |  | 19.3 | 49.4 |
| Ratio of kinematic viscosity (100° C.) and 10% distillation temperature |  | 0.0107 | 0.0109 |
| Ratio of kinematic viscosity (100° C.) and 20% distillation temperature |  | 0.0103 | 0.0106 |
| Ratio of kinematic viscosity (100° C.) and 50% distillation temperature |  | 0.0097 | 0.0101 |
| Difference between 5% distillation temperature and 90% distillation temperature (T90-T5), ° C. |  | 84.6 | 78.6 |

[Evaluation of Lubricating Oil Compositions]

Each of the lubricating oil compositions of Examples 3-1 to 3-2 and Comparative Examples 3-1 to 3-4 were measured for kinematic viscosity at 40° C. or 100° C., viscosity index, HTHS viscosity at 40° C. or 100° C., NOACK evaporation (1 h, 250° C.), CCS viscosity at −35° C. and MRV viscosity at −40° C. The physical property values were measured by the following evaluation methods. The results are shown in Table 12.

(1) Kinematic viscosity: ASTM D-445
(2) HTHS viscosity: ASTM D4683
(3) NOACK evaporation: ASTM D 5800
(4) CCS viscosity: ASTM D5293
(5) MRV viscosity: ASTM D3829

TABLE 12

| Base oil |  |  | Example 3-1 | Example 3-2 | Example 3-3 | Example 3-4 | Example 3-5 | Example 3-6 | Comp. Ex. 3-1 | Comp. Ex. 3-2 | Comp. Ex. 3-3 |
|---|---|---|---|---|---|---|---|---|---|---|---|
|  | (based on total amount of base oil) |  |  |  |  |  |  |  |  |  |  |
| O-1 | Base oil 1 | % by mass | 100 | 100 | 70 | 0 | 0 | 0 | 0 | 0 | 0 |
| O-2 | Base oil 2 | % by mass | 0 | 0 | 0 | 100 | 70 | 0 | 0 | 0 | 0 |
| O-3 | Base oil 3 | % by mass | 0 | 0 | 0 | 0 | 0 | 100 | 0 | 0 | 0 |
| O-4 | Base oil 4 | % by mass | 0 | 0 | 30 | 0 | 30 | 0 | 0 | 100 | 100 |
| O-5 | Base oil 5 | % by mass | 0 | 0 | 0 | 0 | 0 | 0 | 100 | 0 | 0 |
| Additives | (based on total amount of composition) |  |  |  |  |  |  |  |  |  |  |
| A-1 | Viscosity index improver 1 | % by mass | 14 |  |  |  |  |  |  |  |  |
| A-2 | Viscosity index improver 2 | % by mass |  | 8.6 | 7.7 | 6.6 | 6.4 | 6.4 | 5.6 |  | 5.6 |

TABLE 12-continued

|  |  |  | Example 3-1 | Example 3-2 | Example 3-3 | Example 3-4 | Example 3-5 | Example 3-6 | Comp. Ex. 3-1 | Comp. Ex. 3-2 | Comp. Ex. 3-3 |
|---|---|---|---|---|---|---|---|---|---|---|---|
| A-3 | Viscosity index improver 3 | % by mass |  |  |  |  |  |  |  | 6.0 |  |
| B-1 | Other additives | % by mass | 12 | 12 | 12 | 12 | 12 | 12 | 12 | 12 | 12 |
| Evaluation results |  |  |  |  |  |  |  |  |  |  |  |
| Kinematic viscosity | 40° C. | mm$^2$/s | 25.6 | 34.3 | 35.6 | 36.4 | 37.3 | 36.7 | 40.4 | 39.9 | 38.9 |
|  | 100° C. | mm$^2$/s | 7.2 | 9.0 | 8.9 | 8.7 | 8.7 | 8.7 | 8.9 | 8.8 | 8.6 |
| Viscosity index |  |  | 269 | 261 | 245 | 231 | 224 | 229 | 209 | 211 | 210 |
| HTHS viscosity | 100° C. | mPa · s | 4.29 | 5.00 | 5.10 | 5.21 | 5.26 | 5.22 | 5.49 | 5.44 | 5.35 |
|  | 150° C. | mPa · s | 2.61 | 2.61 | 2.60 | 2.60 | 2.60 | 2.60 | 2.60 | 2.60 | 2.60 |
| HTHS (100° C.)/HTHS (150° C.) |  |  | 1.65 | 1.92 | 1.96 | 2.00 | 2.02 | 2.01 | 2.11 | 2.09 | 2.05 |
| NOACK evaporation | 250° C., 1 h |  | 19.0 | 19.4 | 18.0 | 10.8 | 12.0 | 12.0 | 12.2 | 13.8 | 14.0 |
| CCS viscosity | −35° C. | mPa · s | 1800 | 1900 | 3400 | 2700 | 4000 | 3000 | 4850 | 5800 | 7700 |
| MRV viscosity | −40° C. | mPa · s | 3700 | 4600 | 7800 | 6100 | 9300 | 6600 | 12500 | 28000 | 23200 |

As shown in Table 12, the lubricating oil compositions of Examples 3-1 to 3-6 and Comparative Examples 3-1 to 3-3 had approximately equivalent 150° C. HTHS viscosities, but the lubricating oil compositions of Examples 3-1 to 3-6 had lower kinematic viscosities at 40° C., kinematic viscosities at 100° C., HTHS viscosities at 100° C. and CCS viscosities, and thus more satisfactory low-temperature viscosities and viscosity-temperature characteristics, than the lubricating oil compositions of Comparative Examples 3-1 to 3-3. These results demonstrate that the lubricating oil composition of the invention is a lubricating oil composition that has excellent fuel efficiency and low-temperature viscosity, and can exhibit both fuel efficiency and low-temperature viscosity at −35° C. or below while maintaining high-temperature high-shear viscosity at 150° C., even without using a synthetic oil such as a poly-α-olefinic base oil or esteric base oil, or a low-viscosity mineral base oil, and in particular it can reduce the kinematic viscosity at 40° C. and 100° C., increase the viscosity index and notably improve the CCS viscosity at −35° C. of lubricating oils.

The invention claimed is:

1. A hydrocarbon-based lubricating base oil wherein
a urea adduct value is not greater than 4% by mass,
a viscosity index is 100 or higher,
an average of carbon atoms number is 23-31 as determined by gas chromatography distillation,
a value obtained by dividing an integral value of a peak in 30 ppm by an integral value of total peaks in the range from 0 ppm to 50 ppm for the $^{13}$C-NMR spectrum is 0.1-0.2, and
a product of a value obtained by dividing an integral value of peaks attributed to tertiary carbon atoms by an integral value of total peaks in the range of from 0 ppm to 50 ppm for the $^{13}$C-NMR spectrum, and the average of carbon atoms number, is 1.8-2.5.

2. The hydrocarbon-based lubricating base oil according to claim 1, having the average of carbon atoms number of 27-31.

3. The hydrocarbon-based lubricating base oil according to claim 2, wherein the ratio of the tertiary carbon atoms within the fourth carbon atoms from a terminal carbon atom of a main chain is at least 25% and less than 60% based on the total amount of tertiary carbon atoms.

4. The hydrocarbon-based lubricating base oil according to claim 1, having the average of carbon atoms number of at least 23 and less than 27.

5. The hydrocarbon-based lubricating base oil according to claim 4, wherein the ratio of the tertiary carbon atoms within the fourth carbon atoms from a terminal carbon atom of a main chain is at least 25% and less than 70% based on the total amount of tertiary carbon atoms.

6. The hydrocarbon-based lubricating base oil according to claim 4, having a kinematic viscosity at 40° C. of not greater than 25 mm$^2$/s, the viscosity index of 120 or higher and a difference between a 90% distillation temperature and a 5% distillation temperature of not more than 75° C.

7. A method for producing a hydrocarbon-based lubricating base oil comprising:
a step of hydrocracking/hydroisomerization of a feed stock oil containing normal paraffins, so that a urea adduct value of an obtained treated product is not greater than 4% by mass, a viscosity index is 100 or higher, an average of carbon atoms number is 23-31 as determined by gas chromatography distillation, a value obtained by dividing an integral value of a peak in 30 ppm by an integral value of total peaks in the range from 0 ppm to 50 ppm for the $^{13}$C-NMR spectrum is 0.1-0.2, and a product of a value obtained by dividing an integral value of peaks attributed to tertiary carbon atoms by an integral value of total peaks in the range of from 0 ppm to 50 ppm for the $^{13}$C-NMR spectrum, and the average of carbon atoms number, is 1.8-2.5.

8. The method for producing a hydrocarbon-based lubricating base oil according to claim 7, wherein the average of carbon atoms number is 27-31.

9. The method for producing a hydrocarbon-based lubricating base oil according to claim 7, wherein the average of carbon atoms number is at least 23 and less than 27.

10. A lubricating oil composition comprising a hydrocarbon-based lubricating base oil according to claim 1.

11. A lubricating oil composition according to claim 10, further comprising a viscosity index improver, and having a kinematic viscosity at 100° C. of 4-12 mm$^2$/s and a viscosity index of 140-300.

12. The lubricating oil composition according to claim 11, wherein the viscosity index improver is a poly(meth)acrylate-based viscosity index improver.

13. The lubricating oil composition according to claim 12, wherein the PSSI of the poly(meth)acrylate-based viscosity index improver is not greater than 40, and the ratio of the weight-average molecular weight and the PSSI of the poly(meth)acrylate-based viscosity index improver is at least 1×10$^4$.

14. The lubricating oil composition according to claim 11, wherein the ratio of the HTHS viscosity at 100° C. with respect to the HTHS viscosity at 150° C. of the lubricating oil composition satisfies the condition represented by the following inequality (A):

$$\text{HTHS}(100°\text{ C.})/\text{HTHS}(150°\text{ C.}) \leq 2.04 \quad (A),$$

wherein HTHS (100° C.) represents the HTHS viscosity at 100° C. and HTHS (150° C.) represents the HTHS viscosity at 150° C.

* * * * *